(12) United States Patent
Myougan et al.

(10) Patent No.: US 8,407,027 B2
(45) Date of Patent: Mar. 26, 2013

(54) ONLINE DIAGNOSTIC METHOD AND ONLINE DIAGNOSTIC SYSTEM FOR GEOTHERMAL GENERATION FACILITY

(75) Inventors: Ichiro Myougan, Yokohama (JP); Toshikazu Kato, Hino (JP); Isamu Osawa, Narashino (JP); Yasuyuki Hishi, Iwate-gun (JP); Daisuke Fukuda, Morioka (JP); Yasuto Futagoishi, Musashino (JP); Toshiaki Aoki, Higashimurayama (JP)

(73) Assignees: Fuji Electric Systems Co., Ltd., Tokyo (JP); Geothermal Engineering Co., Ltd., Tokyo (JP)

( * ) Notice: Subject to any disclaimer, the term of this patent is extended or adjusted under 35 U.S.C. 154(b) by 154 days.

(21) Appl. No.: 13/054,972

(22) PCT Filed: Oct. 19, 2009

(86) PCT No.: PCT/JP2009/068017
§ 371 (c)(1),
(2), (4) Date: Mar. 3, 2011

(87) PCT Pub. No.: WO2010/047312
PCT Pub. Date: Apr. 29, 2010

(65) Prior Publication Data
US 2011/0144947 A1    Jun. 16, 2011

(30) Foreign Application Priority Data
Oct. 21, 2008 (JP) .................. 2008-271190

(51) Int. Cl.
*G06F 15/00* (2006.01)
(52) U.S. Cl. ........ 702/183; 702/130; 702/136; 700/286; 700/287; 700/291; 705/412; 713/2; 714/2; 60/641.2; 60/641.3

(58) Field of Classification Search .................. 702/24, 702/62, 130, 182–185, 136; 700/286, 297, 700/295, 291; 73/23.35; 705/7, 8, 10, 412; 713/2; 714/2; 60/641.2, 641.3; 29/401.1
See application file for complete search history.

(56) References Cited

U.S. PATENT DOCUMENTS 4,661,459 A * 4/1987 Hirtz .............................. 436/25
5,595,717 A * 1/1997 Harper et al. ................. 423/339
(Continued)

FOREIGN PATENT DOCUMENTS

| JP | 62222140 A | 9/1987 |
| JP | 11326310 A | 11/1999 |

(Continued)

OTHER PUBLICATIONS

Notification of Transmittal of Translation of the International Preliminary Report on Patentability (Form PCT/IB/338), International Preliminary Report on Patentability (Form PCT/IB/373) and Written Opinion of the International Searching Authority (Form PCT/ISA/237), mailed May 26, 2011 for the corresponding International Application No. PCT/JP2009/068017.

*Primary Examiner* — Carol Tsai
(74) *Attorney, Agent, or Firm* — Young Basile

(57) ABSTRACT

An online diagnostic system for a geothermal generation facility is discloses that includes an automatic steam measurement device for measuring a characteristic of steam to be supplied to a steam turbine from a steam-water separator at the geothermal generation facility that outputs analysis data. A monitor-control device controls an operation of the geothermal generation facility while monitoring the geothermal generation facility. A diagnostic device performs at least one of an evaluation of a steam characteristic at the geothermal generation facility, an evaluation of the steam-water separator, and an evaluation of pulsation and confluence of a production well based on the analysis data from the automatic steam measurement device and performance data of the geothermal generation facility from the monitor-control device. An operating status of the geothermal generation facility is diagnosed.

9 Claims, 13 Drawing Sheets

U.S. PATENT DOCUMENTS

| | | | |
|---|---|---|---|
| 6,980,928 B1* | 12/2005 | Graichen et al. | 702/182 |
| 7,206,646 B2* | 4/2007 | Nixon et al. | 700/83 |
| 7,666,679 B2* | 2/2010 | Herzhaft et al. | 436/32 |
| 7,779,290 B2* | 8/2010 | Beekhuis | 714/2 |
| 7,962,247 B2* | 6/2011 | Beekhuis | 700/291 |
| 7,966,100 B2* | 6/2011 | Beekhuis | 700/286 |
| 8,005,640 B2* | 8/2011 | Chiefetz et al. | 702/130 |
| 8,029,288 B2* | 10/2011 | Beekhuis | 434/276 |
| 8,200,369 B2* | 6/2012 | Cheng et al. | 700/287 |
| 2001/0034582 A1* | 10/2001 | Umezawa et al. | 702/136 |
| 2002/0077711 A1* | 6/2002 | Nixon et al. | 700/51 |
| 2005/0007249 A1* | 1/2005 | Eryurek et al. | 340/511 |
| 2006/0178782 A1* | 8/2006 | Pechtl et al. | 700/286 |
| 2008/0236616 A1* | 10/2008 | Bloch | 134/2 |
| 2009/0012653 A1* | 1/2009 | Cheng et al. | 700/287 |
| 2009/0012917 A1* | 1/2009 | Thompson et al. | 705/412 |
| 2009/0043548 A1* | 2/2009 | Beekhuis | 703/3 |
| 2009/0299536 A1* | 12/2009 | Beekhuis | 700/286 |
| 2009/0313056 A1* | 12/2009 | Beekhuis | 705/7 |
| 2009/0313081 A1* | 12/2009 | Beekhuis | 705/10 |
| 2009/0313496 A1* | 12/2009 | Beekhuis | 714/2 |
| 2010/0030493 A1* | 2/2010 | Rao | 702/39 |

FOREIGN PATENT DOCUMENTS

| | | |
|---|---|---|
| JP | 2002131261 A | 5/2002 |
| JP | 2002250271 A | 9/2002 |

* cited by examiner

F I G. 4
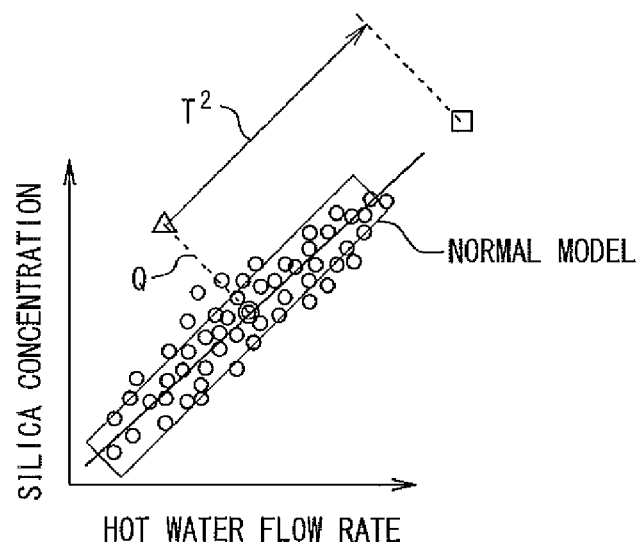
F I G. 5
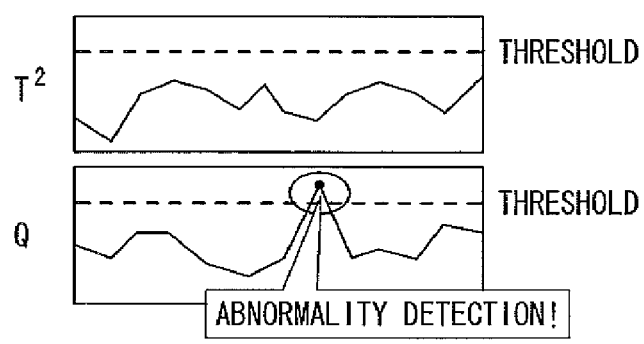

ONLINE DIAGNOSTIC METHOD AND ONLINE DIAGNOSTIC SYSTEM FOR GEOTHERMAL GENERATION FACILITY

TECHNICAL FIELD

The present invention relates to an online diagnostic method and an online diagnostic system for geothermal generation facilities, which predict beforehand decreases in a function of the geothermal generation facilities and operating trouble by utilizing analysis data from an automatic steam measurement device that measures the characteristics of steam supplied from a steam-water separator to a steam turbine and operation data of the geothermal generation facilities in order to carry out operation support for the geothermal generation facility.

BACKGROUND

Geothermal steam ejected from a production well at a geothermal generation facility and supplied to the steam turbine includes various mineral components and gas components. Situations leading to trouble in a geothermal generation output can increase, such as the power of the turbine decreasing when these mineral components adhere to a turbine blade, or the pressure of a steam condenser increasing when non-condensable gas components included in the geothermal steam. For this reason, Japanese Patent Publication No. JP 2002-250271 A (herein "Document 1") proposes a countermeasure for quantitative display and understanding of a scale coating condition resulting over time during normal operation and a scale removal work or clearing work of the turbine blade. In this Patent Document 1, the scale coating condition is monitored by monitoring, while the turbine is operated, decrease over time in nozzle output pressure, which results from increase in amount of adhered scales and ejection on a nozzle plate of the steam turbine through which natural steam ejected from underground is guided, and resulting in decrease in the turbine output.

SUMMARY

In the conventional example given in Patent Document 1, only the scale coating condition is quantitatively displayed and understood based on the pressure difference before and after the turbine nozzle, whereas identification or prediction of the cause of the scale coating is not carried out.

Therefore, the countermeasure for identifying the cause of such a phenomenon and predicting the timing of an occurrence of a trouble so as to prevent beforehand or delay the occurrence of such situations is entirely left to the judgment of a proficient operation staff based on long experience and past records.

Moreover, analysis of dissolved components within steam is conducted about once a month by a supervisor of the geothermal generation facility since it is conducted manually and requires labor and fees. At overseas geothermal generation facilities, there are examples where analysis of the dissolved components within steam is not conducted since securing an analysis technician is difficult. As such, there are unsolved problems of not arbitrarily obtaining data and imposing a heavy burden on training and securing proficient operating staff. However, change in property of the steam supplied to a steam-water separator (referred to as separator hereafter) may be given as a great operation disincentive of the geothermal generation facility.

Design of the separator at the geothermal generation facility is normally conducted in accordance with emission characteristics of the production wells in an early phase of development. However, the characteristics of the production wells often change with age. Due to a drop in well-head pressure or change in gas-liquid ratio, there are hardly any production wells that maintain the production state of the early phase of development. Moreover, the production wells that have been newly drilled and converged for ensuring a sufficient amount of steam often differ greatly in the emission characteristics from the conventional production wells. Accordingly, while it is ideal to monitor the state of the production wells over time and reflect changes (implement alterations and updates) to the design of the separator, setting up alteration conditions in order for the characteristics of the production wells to alter continually is difficult realistically. Besides, considerable expenses for alterations are generated. Therefore, there are very few cases of altering or updating a separator depending on circumstances.

There are cases as examples of altering a separator where the adherence rate of turbine scales is too fast and continuous operation until routine inspection is impossible. However, economic loss is great when a continuous operation until a predetermined routine inspection is impossible as described. Moreover, when a countermeasure is taken once continuous operation has become impossible, stopping power generation several more times for cleaning the turbine scales is inevitable until the countermeasure is completed. The actual situation at many geothermal plants is that open inspection and scale removal are conducted at a high frequency of at least once a year.

To guarantee good quality of this steam, moisture is removed from the geothermal steam taken from the production wells using the separator and is then supplied to a turbine under managed temperature, pressure and flow. While the quality of steam is mainly determined by setting conditions of the separator based on moisture quantity, pressure, and flow, those results are predominantly reflected in the chemical composition. Therefore, understanding of the chemical composition is very important, and operation management using this data has to be utilized for optimal management of the geothermal generation facility. However, it is a fact that, in the past, a full-fledged operation management taking chemical composition data into account is not performed.

Accordingly, the present invention has been made in view of the above unsolved problems of the conventional example and has an object to provide an online diagnostic method and online diagnostic system for geothermal generation facilities, which are capable of diagnosing and confirming at an early stage generation of an abnormality at the geothermal generation facility and accurately anticipating and predicting by monitoring online analysis data representing the characteristics of steam supplied to a steam turbine and operation data of the geothermal generation facilities.

In order to reach the above object, according to an aspect of the present invention, there is provided an online diagnosis method for a geothermal generation facility comprising the steps of: receiving analysis data online from an automatic steam measurement device for measuring a characteristic of steam to be supplied to a steam turbine from a steam-water separator at the geothermal generation facility and performance data of the geothermal generation facility, and diagnosing the geothermal generation facility based on the received data; wherein at least a silica concentration and either a chloride ion concentration or acid conductivity are set as the analysis data, at least steam flow and hot water flow separated by the steam-water separator are set as the performance data, and the analysis data and the performance data are accumulated online so as to diagnose the geothermal generation facility based on the accumulated analysis data, the accumulated performance data, and a predetermined managing upper limit or a predetermined operation recommended value for each data.

Moreover, according to another aspect of the present invention, there is provided an online diagnosis method for a geothermal generation facility comprising the steps of: receiving analysis data online from an automatic steam measurement device for measuring a characteristic of steam to be supplied to a steam turbine from a steam-water separator at the geothermal generation facility and performance data of the geothermal generation facility, and diagnosing the geothermal generation facility based on the received data; wherein at least a silica concentration, either a chloride ion concentration or acid conductivity, a non-condensable gas concentration, and pH are set as the analysis data, at least steam flow and hot water flow separated by the steam-water separator are set as the performance data, the analysis data and the performance data are accumulated in a time-series manner and stored in a data storage unit, and in a state where it is judged that the silica concentration, either the chloride ion concentration or the acid conductivity accumulated and stored in the data storage unit do not reach a predetermined managing upper limit or a predetermined operation recommended value, a prediction of deviation of the analysis data and the performance data from the predetermined managing upper limit or the predetermined operation recommended value is detected based on a statistic calculation and a principle component analysis, which is a multivariate analysis.

In the above online diagnosis method for the geothermal generation facility, at least the silica concentration and the chloride ion concentration are set as the analysis data, at least the steam flow and the hot water flow separated by the steam-water separator are set as the performance data, the silica concentration and the chloride ion concentration are monitored, a warning according to the level of the predetermined managing upper limit or the predetermined operation recommended value is output to the geothermal generation facility, and in the case where at least either one of the silica concentration or the chloride ion concentration exceeds the predetermined managing upper limit or the predetermined operation recommended value, a performance diagnostic result of the steam-water separator is output when a water removal rate of the steam-water separator that is calculated based on the chloride ion concentration, the steam flow, and the hot water flow is equal to or less than a predetermined reference value.

In the above online diagnosis method for the geothermal generation facility, the performance data includes at least the steam flow, the hot water flow, and water level of the water-steam separator, and in the case where the water removal rate is equal to or less than the predetermined reference value and the water level of the water-steam separator does not exceed a predetermined maximum water level, a spray start instruction is output to a spray device for spraying water to steam to be supplied to the steam turbine from the water-steam separator.

In the above online diagnosis method for the geothermal generation facility, a silica accumulated quantity entering the steam turbine is calculated based on the silica concentration and the steam flow, and a silica adherence state to the steam turbine is estimated by making a comparison of the calculated silica accumulated quantity with a turbine inlet pressure, a turbine outlet pressure, and a turbine casing pressure closely related to the silica accumulated quantity to obtain time-series tendencies found through the comparison. In the online diagnosis method for the geothermal generation facility, a quantity of gas to be extracted is calculated based on data of a non-condensable gas concentration from the automatic steam measurement device and performance data of a condenser in a latter stage of the steam turbine, and an operating status of a gas extraction device is diagnosed from a tendency found from a result of the calculation.

According to yet another aspect of the present invention, there is provided an online diagnostic system for a geothermal generation facility, the system comprising: an automatic steam measurement device for measuring a characteristic of steam to be supplied to a steam turbine from a steam-water separator at the geothermal generation facility and outputting analysis data; a monitor•control device for controlling an operation of the geothermal generation facility while monitoring the geothermal generation facility; and a diagnostic device for performing at least one of an evaluation of a steam characteristic at the geothermal generation facility, an evaluation of the steam-water separator, and an evaluation of pulsation and confluence of a production well based on the analysis data from the automatic steam measurement device and performance data of the geothermal generation facility from the monitor•control device, and diagnosing an operating status of the geothermal generation facility. In the above online diagnostic system for the geothermal generation facility, the diagnostic device is configured so as to carry out at least one of display of a diagnostic result of the geothermal generation facility and transmission of the diagnostic result to the monitor•control device.

According to the present invention, at least silica concentration and either chloride ion concentration or acid conductivity are set as the analysis data representing characteristics of steam to be supplied to a steam turbine, steam flow and hot water flow separated by the steam-water separator are set as the performance data, and both data are accumulated online so as to diagnose the geothermal generation facility based on the accumulated analysis data, the performance data, and a managing upper limit or an operation recommended value for each data. This allows constantly accurate diagnosis of the geothermal generation facility. By feeding back diagnostic results of a current geothermal generation facility to the geothermal generation facility, more stable operation is made possible by discovering an occurrence of a problem at an early stage, or preventing it in advance.

Particularly, an application of a statistic calculation and a principle component analysis or method of a multivariate analysis for diagnosis of accumulated data of analytic data and performance data allows detection of a prediction of deviation from the managing upper limit or the operation recommended value of the analysis data and the operating data. Moreover, the silica concentration and the chloride ion concentration are monitored. In the case where at least one of the silica concentration and the chloride ion concentration exceeds the managing upper limit or the operation recommended value, a performance diagnostic result of the steam-water separator when a water removal rate of the steam-water separator that is calculated based on the chloride ion concentration, the steam flow, and the hot water flow is equal to or less than a reference value is output. This allows giving a warning of ability degradation of the water-steam separator.

At this time, when a water removal rate is equal to or less than a reference value and the water level of the steam-water separator is equal to or less than a maximum water level, a water spray device is made to operate for spraying water to steam, which is placed between the steam-water separator and the steam turbine. This allows an increase in existing density (quantity) of mist (micro-water drops) per unit volume, increases opportunities for mist to make contact and unite (adhere) to the other, makes water particles to further adhere to the mist, and increases particle diameter, thereby heightening the water separation efficiency.

Furthermore, the silica adherence state to a steam turbine nozzle may be estimated based on serial tendencies of the silica accumulated quantity entering the steam turbine, a turbine inlet pressure, a turbine outlet pressure, and a turbine casing pressure closely related to the silica accumulated quantity. Yet even further, the quantity of gas to be extracted is calculated from data of non-condensable gas concentration from the automatic steam measurement device and performance data of a condenser in the latter stage of the steam turbine, whereby the operating status of a gas extraction device is diagnosed from their tendencies. Yet even further, by monitoring a state where the silica concentration, or either the chloride ion concentration or the acid conductivity exceeds the managing upper limit, it is made possible to diagnose with accuracy whether there is pulsation of a plurality of production wells or whether there is a change in the confluence condition.

BRIEF DESCRIPTION OF THE DRAWINGS

The description herein makes reference to the accompanying drawings wherein like reference numerals refer to like parts throughout the several views, and wherein:

FIG. 4 is a graph showing correlation between hydrothermal flow rate and silica concentration;

FIG. 5 is a time chart of Q statistics and $T^2$ statistics;

FIG. 6A and FIG. 6B are diagrams for describing structural factors for an abnormality; wherein FIG. 6A is a correlation chart and FIG. 6B is a graph showing contribution plots;

DESCRIPTION OF EMBODIMENTS

Embodiments of the present invention will now be described with reference to the drawings.

Figure 1:
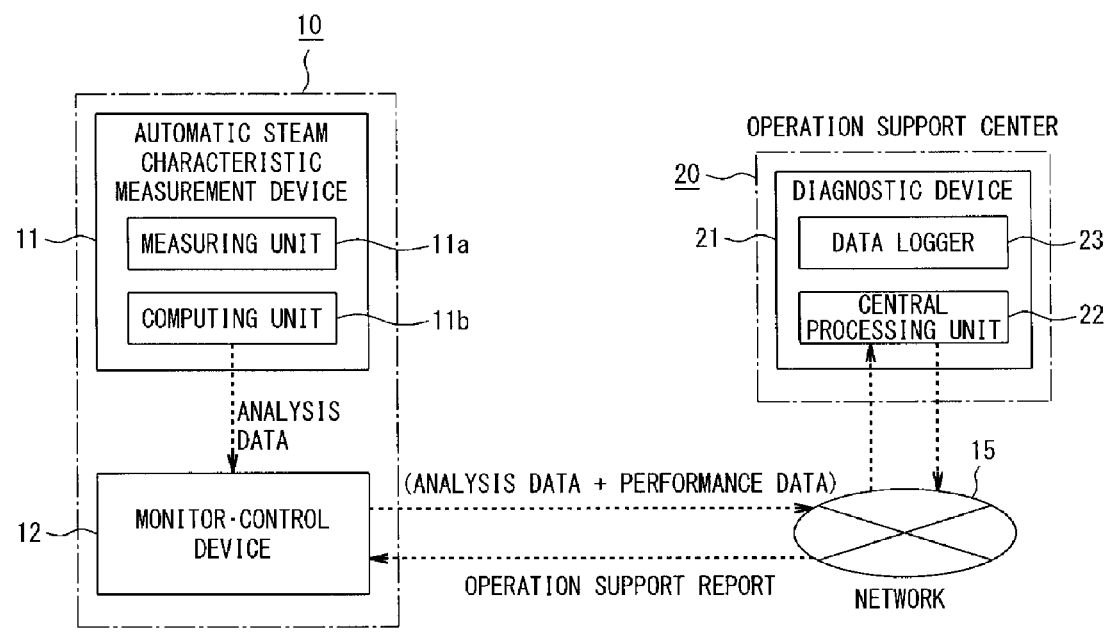
FIG. 1 is a general system configuration diagram illustrative of an embodiment of the present invention.

In FIG. 1, reference numeral 10 denotes a geothermal generation facility. An automatic steam characteristics measurement device 11, which measures characteristics of steam between a steam-water separator described later and a steam turbine and then outputs analysis data, is installed at this geothermal generation facility 10. The analysis data measured and output by the automatic steam characteristics measurement device 11 is sent to a monitor•control device 12, which monitors and controls the operational status of the geothermal generation facility 10. Note that the automatic steam characteristics measurement device 11 is composed of a measuring unit 11a and a computing unit 11b.

With this monitor•control device 12, operation data obtained by appending performance data of a steam-water separator that is self-controlled to the analysis data that has been transmitted is sent online in every predetermined period to an operation support center 20 via an arbitrary network 15 such as the Internet, a local area network, or the like. This operation support center 20 has an online diagnostic device 21. In this online diagnostic device 21, a central processing unit 22 receives the operation data sent from the monitor•control device 12, and the analysis data and the performance data included in the received operation data are then accumulated and in a time-series manner stored in a data logger 23, which is a data storage unit. The central processing unit 22 performs various diagnostic processes described later.

Figure 2:
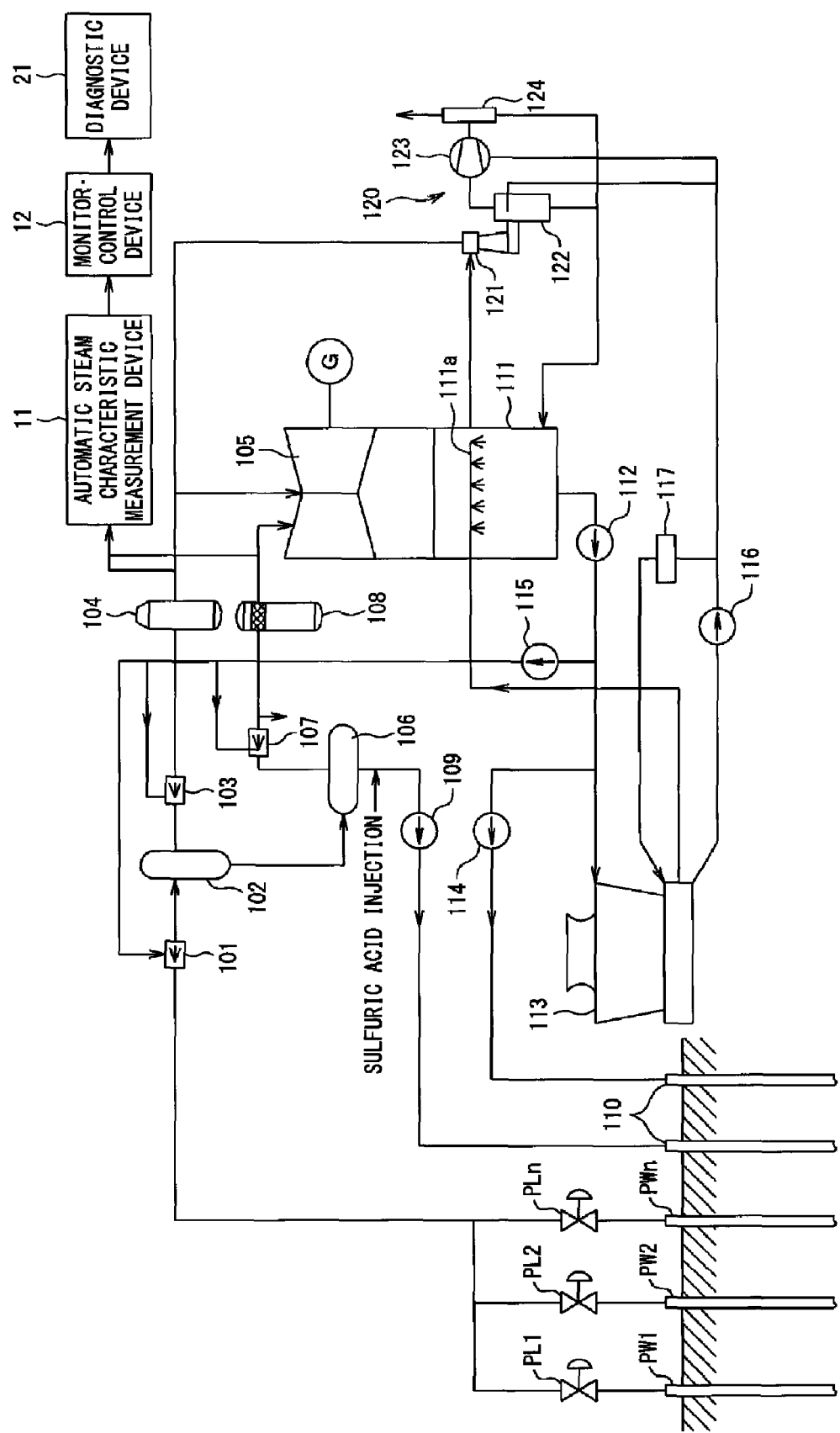
FIG. 2 is a configuration diagram illustrative of a geothermal generation facility.

More specifically, at the geothermal generation facility 10, as shown in FIG. 2, the flow of geothermal steam ejected from multiple n-number (n is a natural number) of production wells PW1 to PWn is regulated and converged by secondary flow regulating valves PL1 to PLn, passes through a water spray device 101, and is then supplied to a high-pressure separator 102 as the steam-water separator. It is separated into steam and hot water by the high-pressure separator 102. The separated steam is supplied via a water spray device 103 to a scrubber 104 in which the steam is cleaned and mist is removed. The steam output from the scrubber 104 is then supplied to a steam turbine 105 on the high-pressure side to which a power generator G is connected.

Meanwhile, the hot water separated by the high-pressure separator 102 is supplied to a low-pressure separator (flusher) 106 by which the hot water is then depressurized and expanded so as to generate secondary steam. The secondary steam generated by this low-pressure separator 106 is supplied to a demister 108 via a water spray device 107, and mist is removed therefrom by the demister 108 and then supplied to the steam turbine 105 on the medium-pressure side. On the other hand, the hot water discharged from the low-pressure separator 106 is pressurized by a brine reinjection pump 109, supplied to an injection well 110, and then returned into the ground.

Moreover, the steam discharged from the steam turbine 105 is supplied to a condenser 111 to be condensed back into water, the condensed water is pressurized by a hot well pump 112, and most of it is supplied to a cooling tower 113 and cooled. Furthermore, the remaining condensed water pressurized by the hot well pump 12 is re-pressurized by a condensed water reinjection pump 114, supplied to the injection well 110, and then returned into the ground. The cold water cooled by the cooling tower 113 is returned to a spray header 111a of the condenser 111 and supplied to the aforementioned respective water spray devices 101, 103, and 107 via a wash-water pump 115. In addition, the cold water cooled down by the cooling tower 113 is pressurized by a cooling water pump 116, a part of the water is re-cooled by a radiator 117 and returned to the cooling tower 113, and the remaining water is supplied to a gas extraction system 120.

This gas extraction system has an ejector 121 supplied for driving with the steam from which mist has been removed by the aforementioned scrubber 104. This ejector 121 withdraws exhaust steam from the condenser 111 so as to control the pressure of exhaust discharged from the steam turbine 105. The exhaust steam withdrawn by the ejector 121 is condensed and separated into gas and water by a barometric condenser 122 to which cold water is supplied from the cooling water pump 116. The separated gas is withdrawn by a vacuum pump 123 to which the cold water is supplied for cooling down from the cooling water pump 116 and then released into the air from a pump seal water separator 124. The water separated by the barometric condenser 122 is returned to the condenser 111, and the pump seal water separated by the pump seal water separator 124 is also returned to the condenser 111.

The steam from which mist is removed by the scrubber 104 and the demister 108 is supplied to the automatic steam measurement device 11 and then measured. This automatic steam measurement device 11 regularly measures the steam supplied to the steam turbine 105, measures silica concentration, chloride ion concentration, acid conductivity, electric conductivity, pH, and non-condensable gas concentration, and supplies them as the analysis data to the monitor•control device 12. The monitor•control device 12 controls the flow through the secondary flow regulating valves PL1 to PLn, which regulate the ejected steam quantity from the production wells PW1 to PWn, quantity of spray by the water spray devices 101, 103, and 107, quantity of steam ejected and withdrawn by the ejector 121, and the like, based on the analytical data input from the automatic steam measurement device 11 and the diagnostic results that are input from the online diagnostic device 21.

Moreover, once the analysis data from the automatic steam measurement device 11 is received by the monitor•control device 12, various performance data such as pressure data of the condenser 111, which is controlled by the monitor•control device 12, temperature data of the ejector 121, the flow of the steam and the hot water separated by the high-pressure separator 102 and the low-pressure separator 106, the well-head pressure, water level in the high-pressure separator 102, inlet and outlet pressures of the steam turbine 105, and the performance data of the condenser 111 are added to the analysis data and sent to the operation support center 20.

At the operation support center 20, once the online diagnostic device 21 and the central processing unit 22 receive the analytical data and the performance data via the network 15, they are stored in a time-series manner in the data logger 23 for every piece of data included in the analysis data and the performance data, and the online diagnostic process of the geothermal generation facility 10 is then carried out based on the in a time-series manner accumulated data stored in the data logger 23.

Figure 3:
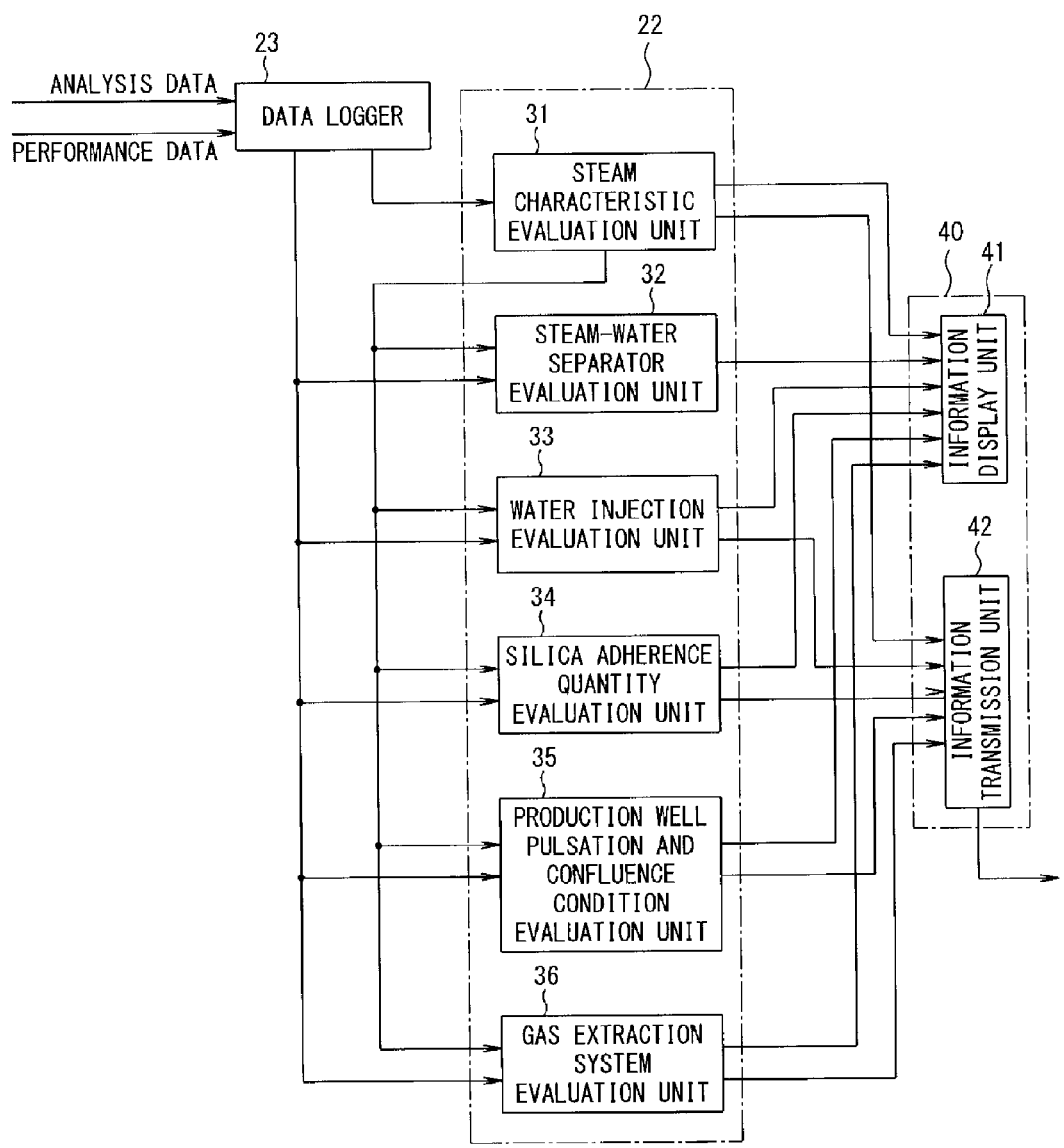
FIG. 3 is a functional block diagram illustrative of a specific configuration of an online support center.

In this case, the central processing unit 22 is configured as a functional block diagram as shown in FIG. 3. In other words, the analysis data and the performance data received from the monitor•control device 12 are accumulated and stored in the data logger 23 for each of the various data. The various pieces of accumulated data stored in this data logger 23 are selectively supplied to a steam characteristic evaluation unit 31, a steam-water separator evaluation unit 32, a water injection evaluation unit 33, a silica-to-steam turbine adherence quantity evaluation unit 34, a production well pulsation and confluence condition evaluation unit 35, and a gas extraction system evaluation unit 36.

Display information output from the steam characteristic evaluation unit 31, the steam-water separator evaluation unit 32, the water injection evaluation unit 33, the silica-to-steam turbine adherence quantity evaluation unit 34, the production well pulsation and confluence condition evaluation unit 35, and the gas extraction system evaluation unit 36 is supplied to an information display unit 41 such as a liquid crystal display, which composes an information output unit 40. This information display unit 41 displays the various pieces of supplied display information. Moreover, diagnostic results and diagnostic information including a warning output from the steam characteristic evaluation unit 31, the steam-water separator evaluation unit 32, the water injection evaluation unit 33, the silica-to-steam turbine adherence quantity evaluation unit 34, the production well pulsation and confluence condition evaluation unit 35, and the gas extraction system evaluation unit 36 are supplied to an information transmission unit 42, which composes the information output unit 40. The information transmission unit 42 transmits the input diagnostic information to the monitor•control device 12 at the geothermal generation facility 10 via the aforementioned network 15.

Here, when the silica concentration, the chloride ion concentration (or acid conductivity), the non-condensable gas concentration, and the pH do not respectively reach individually set managing upper limits, the steam characteristic evaluation unit 31 detects from the accumulated data in a time-series manner stored in the data logger 23 a prediction of deviation from the managing upper limits based on a statistic calculation and a principle component analysis, which is a method of a multivariate analysis. In order to detect this prediction, a normal model as a standard is created by applying the principle component analysis using multivariate data made up of the analysis data and the performance data obtained during plant trial operation or immediately after operation has started. Focusing on the correlation between pieces of variable data, a statistic calculation is carried out, Q statistics and Hotelling's $T^2$ statistics are calculated, and (1) an abnormality is determined if they deviate from the correlation between normal variables (Q statistic) and (2) an abnormality is determined if the amplitude (deviation from the average amplitude) is too large even if it matches the correlation between normal variables ($T^2$ statistic).

The analysis data and the performance data to be transmitted online from the monitor•control device 12 are evaluated by two indices of the aforementioned Q statistics and $T^2$ statistics and to detect any abnormal data. Moreover, the monitoring function is reinforced by calculating abnormal structural factors through contribution plot analysis so as to notify an operator in a message of a variable or abnormal factor and degree of incidence thereof.

Here, if the hot water flow ratio is [(separated hot water flow)/(separated steam flow+separated hot water flow)], in particular, when the silica concentration and hot water flow ratio are set as two variables, a normal model representing correlation between the silica concentration and the hot water flow ratio right after operation has started has a positive correlation as shown in FIG. 4 due to increase in the hot water flow ratio and the silica concentration. This falls within a predetermined range centered around the correlation axis. Here, for example, an abnormality occurs with the high-pressure separator 102 and the like, the silica concentration increases with respect to the hot water flow ratio, and the correlation relationship is disrupted. When a point based on the hot water flow ratio and the silica concentration deviates from the correlation axis of the normal model as denoted by Δ, the deviation from the correlation axis of the normal model is represented by the Q statistics. At the same time, the correlation of the silica concentration and the hot water flow ratio is not disrupted when the hot water low ratio and the silica concentration increase and a point denoted by □ exceeds the range of the normal model. However, the value becomes large, exceeding the range of the normal model, so the amplitude from the center of the normal model becomes the Hotelling's $T^2$ statistic.

Figure 6A:
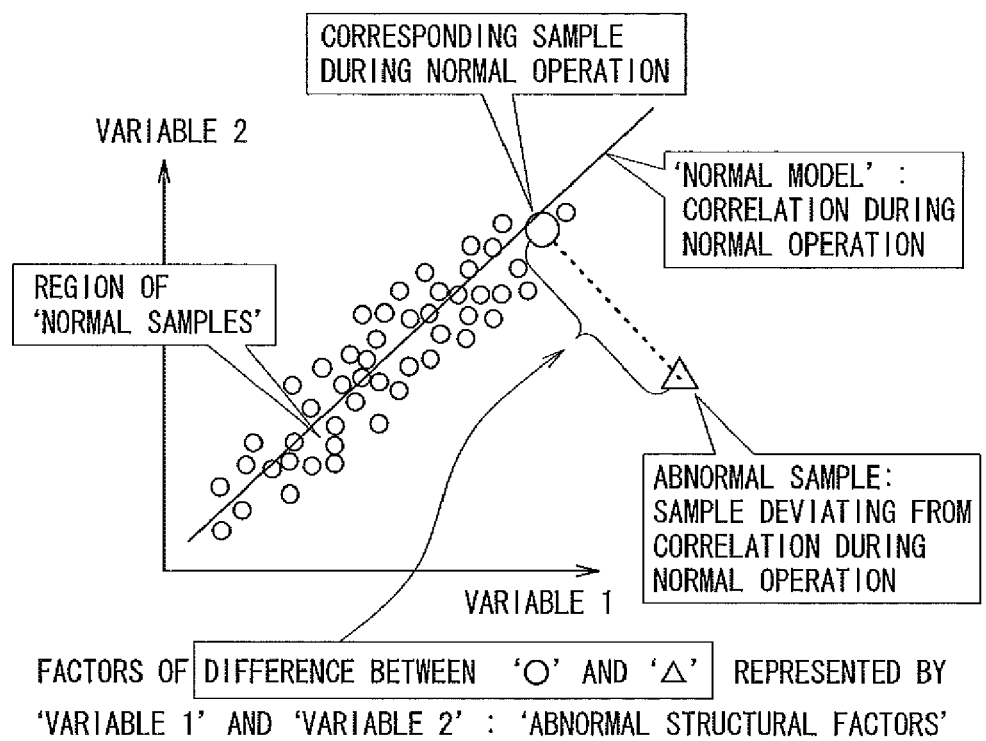
Figure 6B:
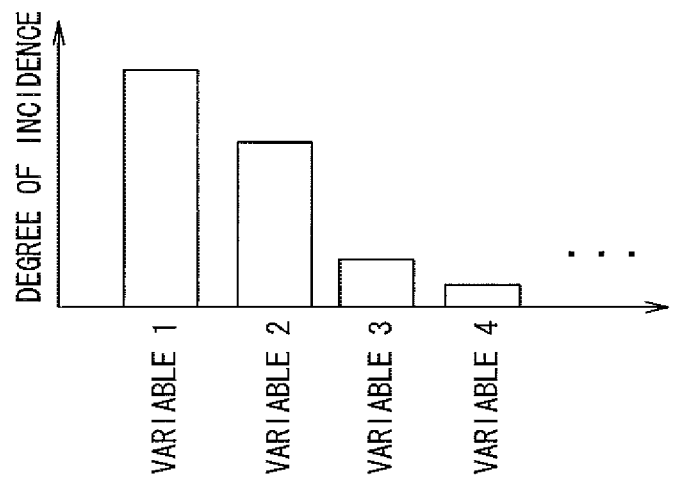

Therefore, even when the silica concentration exceeds the managing upper limit, an abnormality in the case where either the Q statistics or the Hotelling's $T^2$ statistics exceed the threshold may be predicted through calculation of the Q statistics and the Hotelling's $T^2$ statistics as well as determination of the thresholds thereof as shown in FIG. 5 based on the range of the normal model. At this time, a contribution plot for the abnormal Q statistics and Hotelling's $T^2$ statistics allows analysis of the abnormal structural factors. In other words, when the Q statistics exceed the threshold in the case of two variables, variable 1 and variable 2, as shown in FIG. 6A, for example, abnormal structural factors may be calculated from details of the difference between data of the abnormal point denoted by Δ and data of a normal point ○ at the intersection of the correlation axis and a perpendicular line from the correlation axis passing through the abnormal point Δ. The structural factors of this case allow calculation of variables 1, 2, 3, . . . , which are abnormal structural factors, and degrees of incidence thereof as shown in FIG. 6B through a statistical process. A variable with a large degree of incidence may be identified as an abnormal factor.

Therefore, when an abnormality is predicted based on the Q statistics and the $T^2$ statistics, prediction display information representing the prediction result and variables with large degrees of incidence represented in the contribution plot is displayed by outputting it on the information display unit 41. Prediction analysis information is output to the information transmitting unit 42 so as to transmit it to the monitor•control device 12 via the network 15, and control to display or correct the variables identified as abnormal factors.

Moreover, when the deviation prediction analysis process result is normal, the silica concentration and the chloride ion concentration are provided to the steam-water separator evaluation unit 32. This steam-water separator evaluation unit 32 first determines whether or not the silica concentration and the chloride ion concentration have exceeded the respectively pre-set managing upper limit. When both the silica concentration and the chloride ion concentration are equal to or less than their managing upper limit, the high-pressure separator 102 is determined normal, and the water removal rate ηW is calculated based on the following equation (1).

$$\eta W = [(Fw \times Cclw)/(Fw \times Cclw + Fs \times Ccls)] \times 100 \quad (1)$$

Where ηW denotes water removal rate (%), Fs denotes steam flow (t/h), Fw denotes hot water flow (t/h), Ccls denotes chloride ions within steam (ppm), and Cclw denotes chloride ions within hot water. Furthermore, although the chloride ion concentration (Cclw) within the hot water separated by the high-pressure separator 102 differs according to characteristics at each of the geothermal generation facilities, in general, it is approximately 300 ppm to 6000 ppm in Japan. Such a high-concentration chloride ion analyzer currently has a problem of reliability in automatic measurement, and therefore the measurement is often carried out through manual analysis.

Normal display information composed of: display data of the water removal rate ηW calculated by a water removal rate calculation unit 32a of the steam-water separator evaluation unit 32; and guidance display information of 'The steam-water separator is functioning effectively.' is output to the information display unit 41, which is included in the information output unit 40. On the other hand, when either the silica concentration or the chloride ion concentration exceeds the managing upper limit, the high-pressure separator 102 is determined to be deteriorated in performance, and the water injection amounts of the water spray devices 101, 103, and 107 are set so as to be equal to or greater than a managing upper limit ηWu preset according to the water removal rate ηW. Performance deterioration display information composed of guidance display information of 'Improvement is possible by the steam-water separator independently. Carrying out water spraying after confirmation of the water level in the steam-water separator is recommended.' and the current water removal rate ηW are then output to the information display unit 41, which is included in the information output unit 40.

Moreover, in the case where the water injection evaluation unit 33 is provided with the silica concentration and the chloride ion concentration when the deviation prediction analysis process result is normal, and either the silica concentration or the chloride ion concentration is equal to or less than the managing upper limit, the high-pressure separators 102 and 106 are determined normal and guidance display information of 'The steam-water separator is functioning effectively. Water injection is unnecessary.' is output to the information display unit 41.

Meanwhile, when either the silica concentration or the chloride ion concentration exceeds the corresponding managing upper limit, the water injection amounts of the water spray devices 101, 103, and 107 are set such that the silica concentration or the chloride ion concentration is equal to or less than the corresponding managing upper limit. Information of the set water injection amounts is output to the information transmission unit 42 and then transmitted to the monitor•control device 12 via the network 15. Moreover, when the silica concentration or the chloride ion concentration exceeding the corresponding managing upper limit has dropped to be equal to or less than the managing upper limit, guidance display information of 'The steam-water separator is functioning effectively when injecting water.' is output to the information display unit 41.

Furthermore, the silica adherence quantity evaluation unit 34 frequently acquires the silica concentration from the aforementioned automatic steam measurement device 11 as well as the steam flow included in the accompanying performance data. This allows calculation of highly accurate silica accumulated quantity that has entered the steam turbine 105. In addition, the degree of silica adherence to the steam turbine 105 is estimated from serial tendencies of turbine inlet pressure, turbine outlet pressure, and turbine casing pressure, which are indices of adherence of foreign matter such as silica in the steam turbine 105, and accumulated quantity of silica that has entered the steam turbine 105. The rate of change in silica adherence to the steam turbine 105 is also estimated through determination of an increasing tendency of the accumulated quantity of silica and increasing tendencies of the turbine inlet pressure, the turbine outlet pressure, and the turbine casing pressure. When the degree of silica adherence has exceeded a predetermined quantity or rate of change in silica adherence has exceeded a predetermined value, guidance display information such as 'The silica accumulated quantity has increased and the turbine casing pressure has increased.' is output to the information display unit 41.

When the silica concentration and the chloride ion concentration are less than the managing upper limit, the production well pulsation and confluence condition evaluation unit 35 outputs guidance display information of 'The production wells are functioning effectively' to the information display unit 41. When either one of the silica concentration or the chloride ion concentration is equal to or greater than the corresponding managing upper limit, and either when the state of it being equal to or greater than the managing upper limit continues or does not continue for a predetermined duration, it is determined that there is a change in the confluence condition, while there is no change in openings of the secondary flow regulating valves PL1 to PLn. Then, the guidance display information of 'There is a change in confluence condition' is output to the information display unit 41. When either one of the silica concentration or the chloride ion concentration is equal to or greater than the corresponding managing upper limit, but such a state has not continued, and when there is a change in openings of the secondary flow regulating valves PL1 to PLn, it is determined that there is the pulsation of the production wells PW1 to PWn. Then, the guidance display information of 'There is pulsation of the production wells' is output to the information display unit 41.

Furthermore, the gas extraction system evaluation unit 36 analyzes the operation status of the gas extraction system 120. The gas extraction system 120 is an important device for maintaining a constant pressure on the turbine outlet side of the steam turbine 105 so as to allow a stable operation of the steam turbine 105. The capacity of the gas extraction system 120 is determined by the quantity of gas to be extracted. This quantity of gas to be extracted is a non-condensable gas originally contained in the steam in the production wells and air released from water saturated during the operation of the condenser 111 at the turbine outlet and the cooling water of the condenser 111. Among the above gasses, the non-condensable gas accompanying the steam of the production wells is unique to the production wells. However, this gas changes through additional confluence or partial separation of the production wells. It also often changes over time. Measured data of non-condensable gas ratio from the automatic steam measurement device 11 is extremely helpful for an optimal operation of the gas extraction system 120. The non-condensable gas quantity anticipated in the initial design stage generally is a redundant value for safety. While the quantity of driving steam for driving the ejector 121 cannot be specified as it changes depending on the configuration and operating pressure of the gas extraction system 120, in a certain example, approximately 4 to 7% of the steam supplied to the steam turbine 105 is consumed at a power plant using the geothermal steam containing approximately 2% non-condensable gas. If this steam quantity is optimized for the present conditions, the increase in electricity generated corresponding to the amount of steam saved may be expected.

Necessary performance data for an operating status diagnosis and warning of the gas extraction system 120 is inlet temperature and pressure of an extracted gas ejector, and inlet and outlet temperatures of the cooling water of the condenser 111. If the above-described data can be measured, it is possible to calculate the quantity of gas to be extracted by the ejector 121. The quantity of steam saturated into non-condensable gas and air is found through the following equation.

$$Fejt = [(Fncg + Fair) \times [Ps/(Pt-Ps)]] \quad (2)$$

Where Fejt denotes the quantity of steam saturated into non-condensable gas and air ($Nm^3/h$), Fncg denotes non-condensable gas amount ($Nm^3/h$), Ps denotes vapor pressure of water at the ejector inlet temperature (kPa), Pt denotes ejector inlet pressure (kPa), and Fair denotes air quantity ($Nm^3/h$).

Moreover, if the cold water in the condenser 111 is the cold water in the air-cooled cooling tower 113, quantity of air (Fair) to be released from this cold water may also be calculated based on Henry's law. In other words, the released air amount is the difference between the amount of air mixed into cold water and amount of the cooled, extracted gas mixed into heated water. While the calculation method based on this Henry's law is well-known and description thereof is thus omitted here, the total quantity of gas to be ultimately extracted by the gas extraction system 120 is represented as follows:

$$Fncg(\text{non-condensable gas quantity}) + Fejt(\text{quantity of steam saturated into non-condensable gas}) + Fair (\text{quantity of air released from cold water})$$

This allows calculation of the quantity of steam Fejt saturated into non-condensable gas and quantity of air Fair released from the cold water. Moreover, the quantity of air Fair may be found through calculation of the difference between the quantity of non-condensable gas and the value resulting from removing the aforementioned saturating water quantity from the reading of a flow meter that is placed at a gas extraction device outlet, and may also be estimated even when actually measuring the oxygen concentration of the extracted gas. Namely, it may be found by calculating the following equation.

$$Fair = (A \times X1 \times 0.01)/0.21 \quad (3)$$

Where A denotes the flow meter placed at the gas extraction device outlet ($Nm^3/h$), X1 denotes the oxygen concentration at the gas extraction device outlet (vol), and 0.21 means that the oxygen concentration in the air is 21%. Then, it is determined whether or not the calculated total quantity of gas to be extracted exceeds a design value, and when it is equal to or less than the design value, it is determined whether or not the ejector inlet pressure Pt has reached a set value. In the case where it has not reached the set value, the guidance display information of 'the gas extraction system is not functioning normally.' is output to the information display unit 41. In the case where it has reached the set value, the guidance display information of 'the gas extraction system is functioning normally.' is output to the information display unit 41.

Furthermore, in the case where the total quantity of gas to be extracted exceeds the design value, it is determined whether or not the quantity of non-condensable gas, the quantity of air released from the cooling water, and the quantity of steam saturated in the non-condensable gas exceed the respective corresponding design values. As a result, a warning to the operator is sent by outputting to the information display unit warning guidance display information in accordance with the combination of non-condensable gas quantity, air quantity, and steam quantity exceeding the design values.

Figure 7:
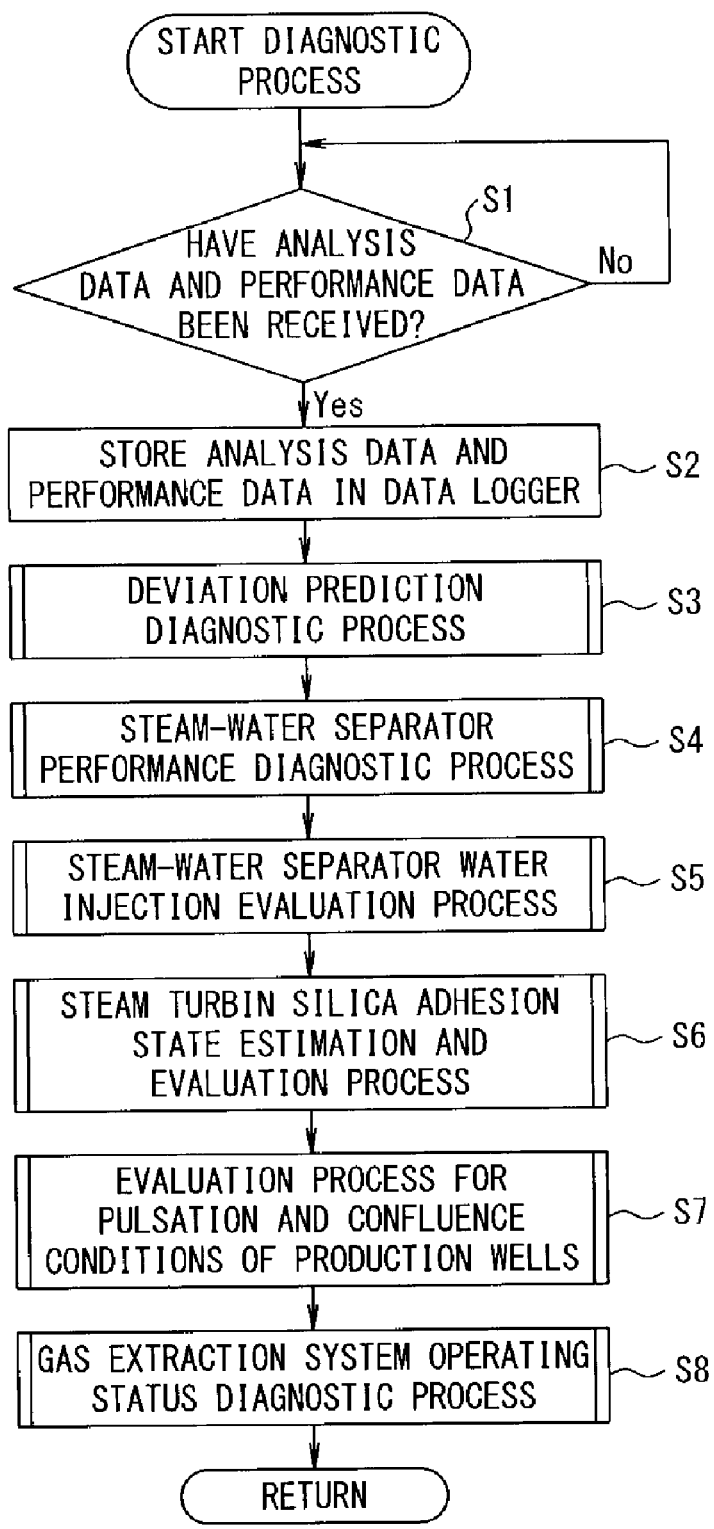
FIG. 7 is a flowchart showing an exemplary diagnostic process of a diagnostic device.

An online diagnostic process shown in FIG. 7 is carried out by the central processing unit 22. In this online diagnostic process, as shown in FIG. 7, it is firstly determined in step S1 whether or not the analysis data and the performance data have been received from the monitor•control device 12. When the analysis data and the performance data have not been received, it waits until they are received, and when they have been received, processing proceeds to step S2.

In this step S2, the received analysis data and the performance data are stored in a time-series manner in the data logger 23 for every type of data. Proceeding to step S3, a deviation prediction diagnostic process of predicting deviation from the managing upper limit is carried out. Then, proceeding to step S4, the performance diagnostic process of the high-pressure separator 102 is carried out before proceeding to step S5. In step S5, a water injection evaluation process before and after the high-pressure separator 102 is carried out. Proceeding to step S6, a silica adhesion state estimation and evaluation process of the steam turbine 105 is carried out and then the processing proceeds to step S7.

Figure 8:
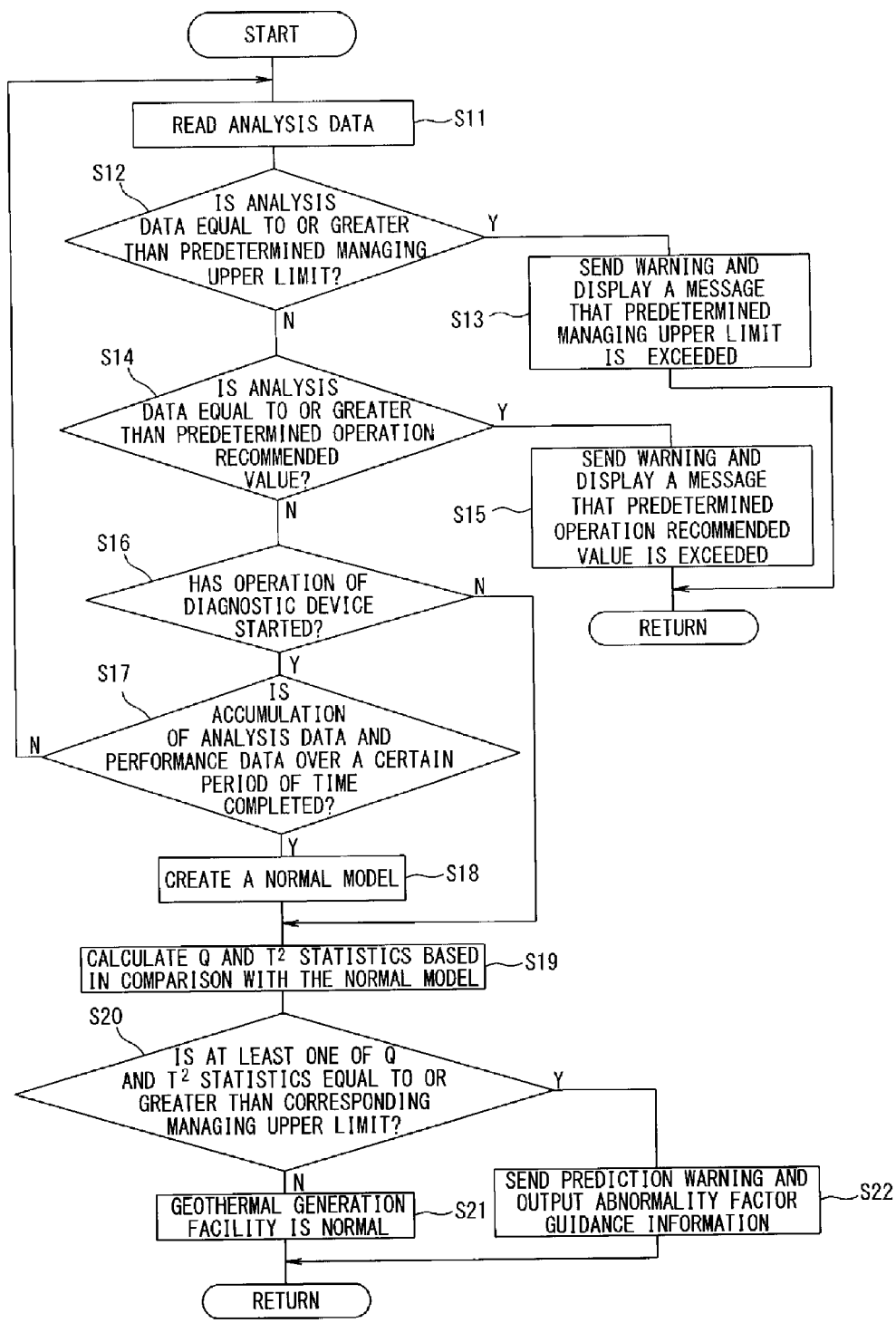
FIG. 8 is a flowchart showing an exemplary deviation prediction diagnostic process given in S3 of FIG. 7.

In step S7, a pulsation and confluence evaluation process for evaluating a change in confluence conditions of the production wells PW1 to PWn is carried out. Proceeding to step S8, an operating status diagnostic process for the gas extraction system 120 is carried out, and then the processing returns to step S1. Here, the deviation prediction diagnostic process of step S3 is a process carried out by the aforementioned steam characteristic evaluation unit 31 as shown in FIG. 8.

Firstly, in step S11, the analysis data such as the silica concentration, and either the chloride ion concentration or the acid conductivity, and the non-condensable gas concentration and the pH are read. Proceeding next to step S12, it is determined whether or not at least one of the silica concentration, and either the chloride ion concentration or the acid conductivity, the non-condensable gas concentration, or the pH, which are all included in the analysis data, is equal to or greater than the corresponding managing upper limit. Processing proceeds to step S13 when this determination result is that at least one of the silica concentration, either the chloride ion concentration or the acid conductivity, the non-condensable gas concentration, or the pH is equal to or greater than the corresponding managing upper limit. In this steps S13, the warning guidance display information of 'corresponding analysis data exceeds managing upper limit' is output to the information display unit 41, as well as a warning of exceeding the managing upper limit is output to the information transmission unit 42 of the information output unit 40, and then processing proceeds to step S4.

Moreover, processing proceeds to step S14 when this determination result of the above step S12 is that all of the silica concentration, either the chloride ion concentration or the acid conductivity, and the non-condensable gas concentration and the pH included in the analysis data are less than the respective corresponding managing upper limits. In this step S14, it is determined whether or not that at least one of the silica concentration, either the chloride ion concentration or the acid conductivity, the non-condensable gas concentration, or the pH included in the analysis data is equal to or greater than an operating recommended value that is set lower than the managing upper limit. Processing proceeds to step S15 when this determination result is that at least one of the silica concentration, either the chloride ion concentration or the acid conductivity, the non-condensable gas concentration, or the pH included in the analysis data is equal to or greater than the corresponding operating recommended value. In this steps S15, the warning guidance display information of 'exceeds operating recommended value' is output to the information display unit 41, as well as a warning of exceeding the operating recommended value is output to the information transmission unit 42, and then processing proceeds to step S4.

Meanwhile, processing proceeds to step S16 when the determination result of step S14 is that all of the silica concentration, either the chloride ion concentration or the acid conductivity, and the non-condensable gas concentration and the pH included in the analysis data are less than the respective corresponding operating recommended values. In this step S16, it is determined whether or not it is time to start the operation of the geothermal generation facility 10, and processing proceeds to step S17 when it is time to start the operations thereof. In this step S17, it is determined whether or not analytic data and performance data of a fixed period have been accumulated. When collection of the analytic data and the performance data of a fixed period has not been completed, processing returns to the aforementioned step S11, and when the collection of the analytic data and the performance data of a fixed period has been completed, processing proceeds to step S18.

In this step S18, a normal model is created from the analysis data and the performance data of the fixed period through principle component analysis. Proceeding to step S19, the Q statistic and the $T^2$ statistic are calculated based on comparison with the normal model.

Next, processing proceeds to step S20, it is determined whether or not at least one of the calculated Q statistic or the $T^2$ statistic is equal to or greater than the predetermined corresponding managing upper limit based on a data range of the normal model. When this determination result is less than the managing upper limit, processing proceeds to step S21, so the guidance display information of 'The geothermal generation facility is normal.' is output to the information display unit 41, and processing then proceeds to step S4. Moreover, when this determination result is that at least either one of the Q statistic or the $T^2$ statistic is equal to or greater than the corresponding managing upper limit, processing proceeds to step S22 to output prediction warning information to the information transmission unit 42 and output abnormal factor guidance display information to the information display unit 41, and processing then proceeds to step S4.

Figure 9:
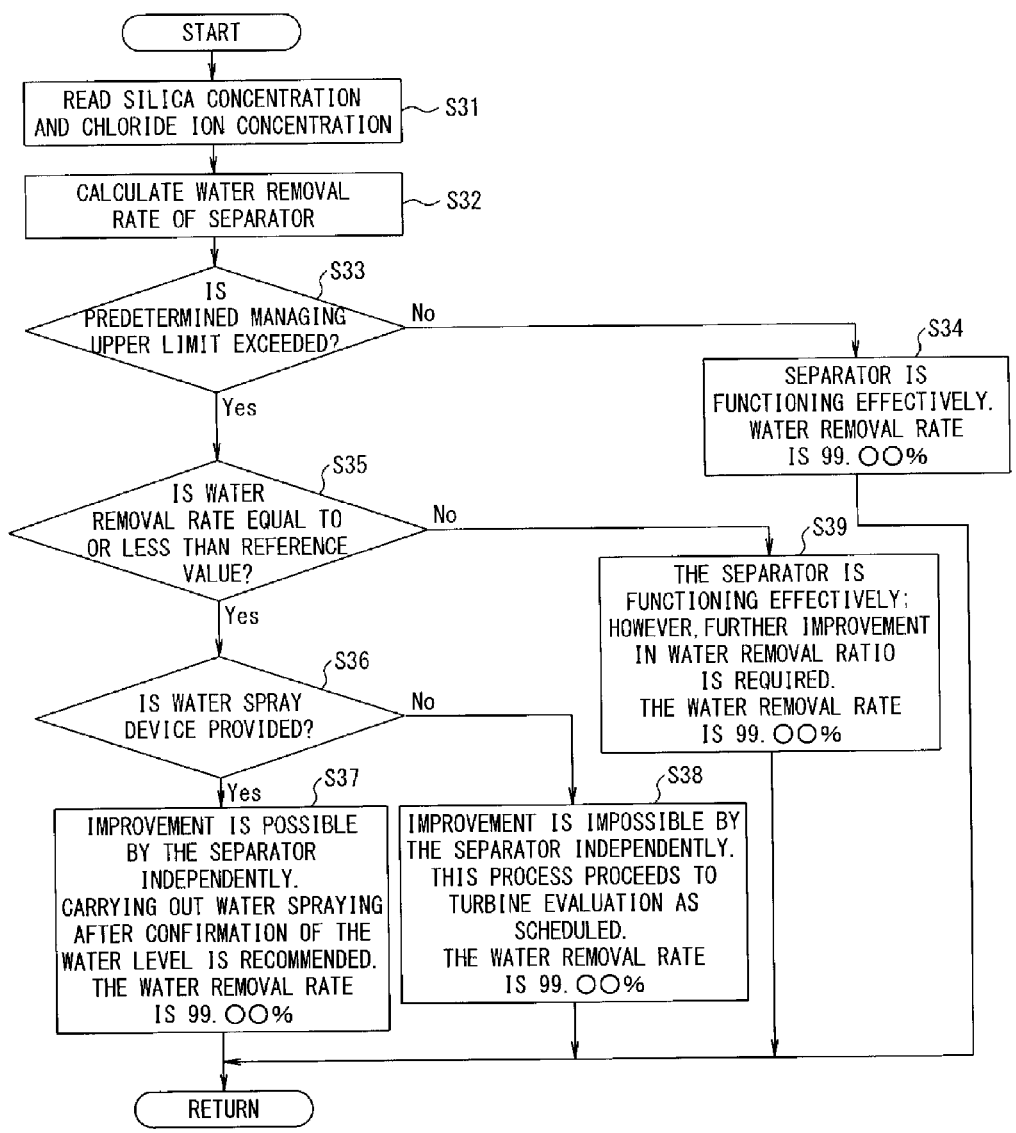
FIG. 9 is a flowchart showing an exemplary steam-water separator performance diagnostic process given in S4 of FIG. 7.

Furthermore, the steam-water separator deviation prediction diagnostic process of the above step S4 is as given in FIG. 9. Firstly, in step S31, the silica concentration, the chloride ion concentration, the steam flow, and the hot water flow are read. Proceeding to step S32, the above Equation (1) is calculated based on the read silica concentration, the chloride ion concentration, the steam flow, and the hot water flow, and the water removal ratio $\eta W$ of the high-pressure separator 102 is then calculated.

Next, processing proceeds to step S33, and it is determined whether or not at least either one of the silica concentration or the chloride ion concentration exceeds the corresponding managing upper limit. When both of the silica concentration and the chloride ion concentration are equal to or less than the respective corresponding managing upper limits, processing proceeds to step S34. The guidance display information of 'The separator is functioning effectively. Water removal rate is 99.OO %' is output to the information display unit 41, and processing then proceeds to step S4.

Next, in the case where the determination result of step S33 is that at least either one of the silica concentration or the chloride ion concentration exceeds the corresponding managing upper limit, processing proceeds to step S35 to determine whether or not the water removal ratio $\eta W$ calculated in the above step S32 is equal to or less than a predetermined reference value $\eta Ws$. In the case where this determination result is that the water removal ratio $\eta W$ exceeds the reference value $\eta Ws$, processing proceeds to step S39. The guidance display information of 'The separator is functioning effectively; however, further improvement in water removal ratio is required' is output to the information display unit 41, and processing then proceeds to step S4.

Then, in the case where this determination result is that the water removal ratio $\eta W$ is equal to or less than the reference value $\eta Ws$, processing proceeds to step S36 to determine whether or not the water spray device 101 exists. When there is a water spray device 101, processing proceeds to step S37 and the guidance display information of 'Improvement is possible by the separator independently. Carrying out water spraying after confirmation of the water level in the steam-water separator is recommended. The water removal rate is 99.OO %.' is output to the information display unit 41, and processing then proceeds to step S4.

Moreover, in the case where this determination result of the above step S36 is that the water spray device 101 exists, processing proceeds to step S38, the guidance display information of 'Improvement is impossible by the separator independently. This process proceeds to turbine evaluation if the state does not change. The water removal rate is 99.00 %.' is output to the information display unit 41, and processing then proceeds to step S5. Furthermore, a steam-water separator deviation water injection evaluation process of step S5 is as given in FIG. 10. Firstly, in step S41, the silica concentration and the chloride ion concentration are read in step S41, processing proceeds to step S42. Then, it is determined whether or not at least either one of the silica concentration or the chloride ion concentration exceeds the corresponding managing upper limit When neither the silica concentration nor the chloride ion concentration exceeds the corresponding managing upper limit, processing proceeds to step S43. The guidance display information of 'The separator is functioning effectively. Water injection is unnecessary.' is output to the information display unit 41, and processing then proceeds to step S5.

Next, in the case where this determination result of the above step S42 is that at least either one of the silica concentration or the chloride ion concentration exceeds the corresponding managing upper limit, processing proceeds to step S44. Then, it is determined whether or not the separator water level exceeds a predetermined maximum water level. In the case where this determination result is that the separator water level exceeds the maximum water level, processing proceeds to step S45. The guidance display information 'The separator is not functioning effectively. Lower the water level of the separator.' is output to the information display unit 41, and processing then proceeds to step S5.

Moreover, in the case where this determination result of the above step S44 is that the separator water level does not exceed the maximum water level, processing proceeds to step S46. A water injection quantity command value for the water spray device 101 is output to the information transmission unit 42, and processing then proceeds to step S47. In this step S47, it is determined whether or not new silica concentration and chloride ion concentration have been received. When neither of the silica concentration nor the chloride ion concentration has been received, it waits until they are received. When the silica concentration and the chloride ion concentration have been received, processing proceeds to step S48 to determine whether or not at least one of the new silica concentration or chloride ion concentration exceeds the corresponding managing upper limit. Processing returns to the above step S46 when at least either one of the silica concentration or the chloride ion concentration exceeds the corresponding managing upper limit. When both of the silica concentration and the chloride ion concentration are equal to or less than the respective corresponding managing upper limits, processing proceeds to step S49. The guidance display information of 'The separator is functioning effectively when water is injected.' is output to the information display unit 41, and processing then proceeds to step S5.

Figure 11:
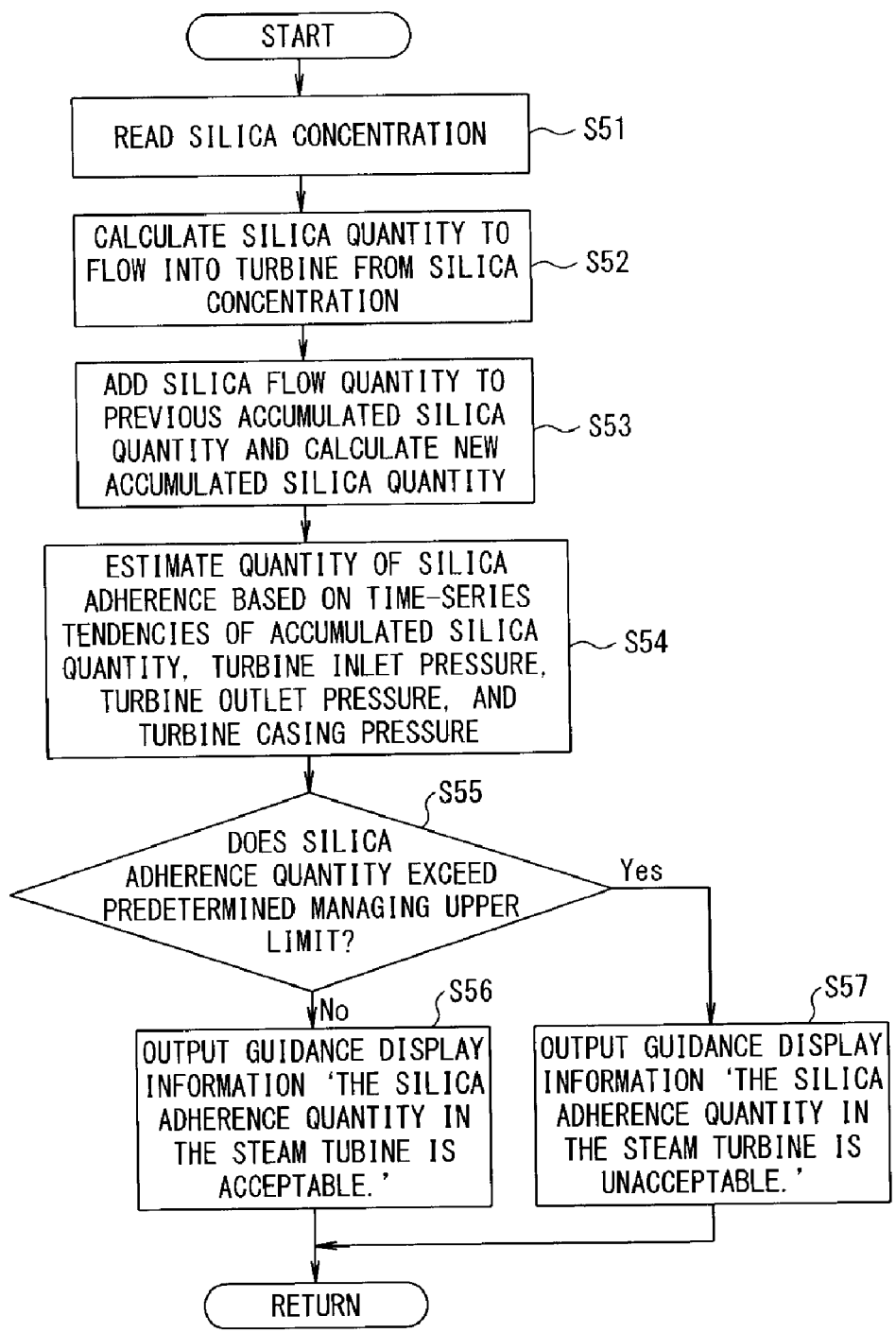
FIG. 11 is a flowchart showing an exemplary steam turbine silica adhesion state estimation and evaluation process given in S6 of FIG. 7.

A steam turbine silica adhesion state estimation and evaluation process of step S6 is as given in FIG. 11. Firstly, in step S51, the silica concentration, turbine inlet pressure, turbine outlet pressure, and turbine casing pressure are read, processing proceeds to step S52. Then, the silica quantity to flow into the steam turbine 105 is then calculated based on the silica concentration. Processing proceeds to step S53, a value resulting from adding the calculated silica quantity to the previous silica accumulated quantity is made as new silica accumulated quantity, and processing proceeds to step S54. In this step S54, the amount of silica adherence to the steam turbine 105 is estimated based on the new silica accumulated quantity and time-series tendencies of the turbine inlet pressure, the turbine outlet pressure, and the turbine casing pressure, which are indices of adherence of scales such as silica in the steam turbine 105.

Next, processing proceeds to step S55, it is determined whether or not the estimated silica adherence quantity has exceeds the preset managing upper limit. When the estimated silica adherence quantity does not exceed the managing upper limit, the guidance display information of 'The silica adherence quantity in the steam turbine is acceptable.' is output to the information display unit 41 and processing then proceeds to step S6. Moreover, in the case where this determination result of step S55 is that the estimated silica adherence quantity exceeds the preset managing upper limit, processing proceeds to step S57. The guidance display information of 'The silica adherence quantity in the steam turbine is unacceptable.' is output to the information display unit 41, and processing then proceeds to step S6.

Note that in the aforementioned steam turbine silica adhesion state estimation and evaluation process, the degree of silica adherence is estimated based on the silica accumulated quantity and time-series tendencies of the turbine inlet pressure, the turbine outlet pressure, and the turbine casing pressure. However, the present invention is not limited thereto, and increasing tendencies of the silica accumulated quantity and the turbine inlet pressure, the turbine outlet pressure, and the turbine casing pressure may be detected, so that the guidance display information may be output to the information display unit 41 when the rate of change in the silica adherence quantity exceeds a predetermined value.

Figure 12:
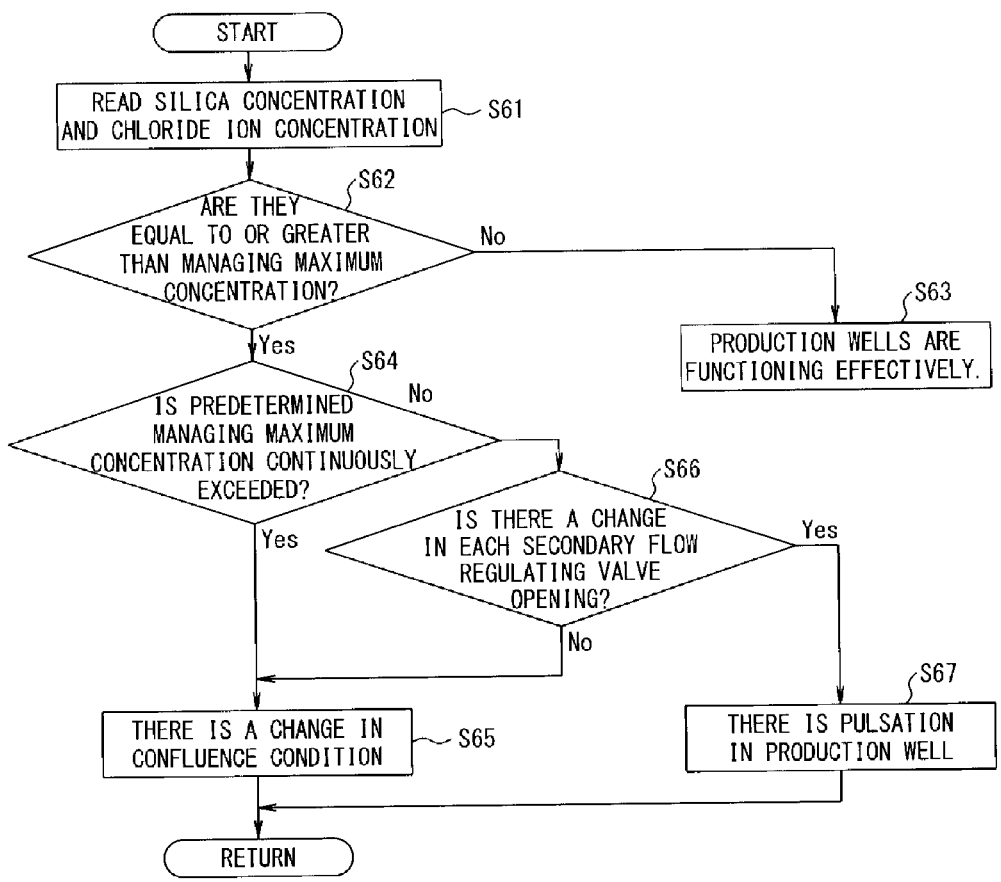
FIG. 12 is a flowchart showing an exemplary evaluation process for pulsation and confluence conditions of production wells given in S7 of FIG. 7.

Furthermore, an evaluation process for pulsation and confluence conditions of production wells of step S7 is as given in FIG. 12. Firstly, the silica concentration and the chloride ion concentration are read in step S61. Proceeding to step S62 to determine whether or not at least either one of the silica concentration or the chloride ion concentration has exceeded the managing upper limit. When this determination result is that neither of the silica concentration nor the chloride ion concentration exceeds the managing upper limit, processing proceeds to step S63. The guidance display information of 'The production wells are functioning effectively' is output to the information display unit 41, and processing then proceeds to step S7.

Next, in the case where this determination result of step S62 is that at least either one of the silica concentration or the chloride ion concentration exceeds the corresponding managing upper limit, processing proceeds to step S64. Then, it is determined whether or not either one of the silica concentration or the chloride ion concentration is continuously exceeding the managing upper limit. In the case where this determination result is that it is continuously exceeding the managing upper limit, processing proceeds to step S65. The guidance display information of 'There is change in confluence condition' is output to the information display unit 41, and processing proceeds to step S7. In the case where it is not continuously exceeding the managing upper limit, processing proceeds to step S66.

Figure 13:
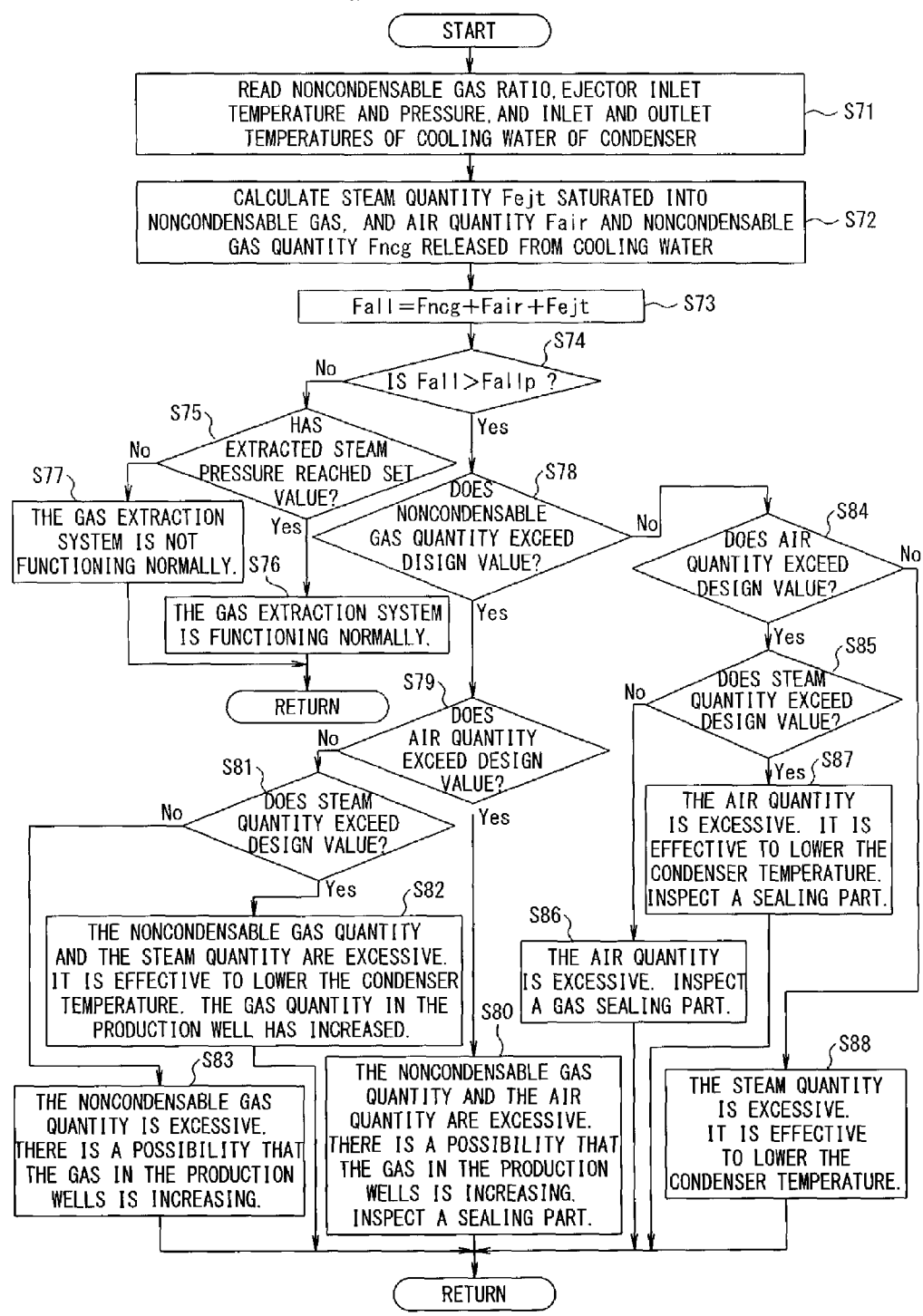
FIG. 13 is a flowchart showing an exemplary a gas extraction system operating status diagnostic process given in S8 of FIG. 7.

In step S66, it is determined whether or not there is a change in the openings of the respective secondary flow regulating valves PL1 to PLn. When there is no change in the openings, processing proceeds to the above step S65. When there is a change in the openings, processing proceeds to step S67. In this step S67, the guidance display information of 'There is pulsation in the production wells' is output to the information display unit 41 and processing proceeds to step S7. Furthermore, a gas extraction system operating status diagnostic process of the step S8 is as given in FIG. 13. Firstly, in step S71, the non-condensable gas ratio, the extracted gas ejector inlet temperature and pressure, and the inlet and outlet temperatures of the cooling water of the condenser 111 are read. Next, processing proceeds to step S72, and according to the above Equation (2), the steam quantity Fejt saturated into the non-condensable gas is calculated and the air quantity Fair and the non-condensable gas quantity Fncg released from the cooling water are also calculated.

Next, processing then proceeds to step S73, and the non-condensable gas quantity Fncg, the steam quantity Fejt to be saturated into the non-condensable gas, and the air quantity Fair to be released from the cooling water are added together so as to calculate a total extracted gas quantity Fall.

Next, processing proceeds to step S74, and it is determined whether or not the total extracted gas quantity Fall exceeds a preset design value Fallp. When the total extracted gas quantity Fall does not exceed the design value Fallp, processing proceeds to step S75. Then, it is determined whether or not the extracted steam pressure has reached a preset value. When this determination result is that the extracted steam pressure has not reached the preset value, processing proceeds to step S77. The guidance display information of 'The gas extraction system is not functioning normally.' is output to the information display unit 41, and processing then returns to the aforementioned step S1. On the other hand, when the determination result of step S75 is that the extracted steam pressure has reached the preset pressure, processing proceeds to step S76. The guidance display information of 'The gas extraction system is functioning normally.' is output to the information display unit 41, and processing then returns to the aforementioned step S1.

Furthermore, in the case where the determination result of step S74 is that the total extracted gas quantity Fall exceeds the design value Fallp, the processing proceeds to step S78, and it is determined whether or not the non-condensable gas quantity Fncg exceeds a preset design value Fncgp. When this determination result is that the non-condensable gas quantity Fncg exceeds a preset design value Fncgp, processing proceeds to step S79, and it is determined whether or not the air quantity Fair exceeds a preset design quantity Fairp. When this determination result is that the air quantity Fair exceeds the design value Fairp, processing proceeds to step S80. The guidance display information of 'The non-condensable gas quantity Fncg and the air quantity Fair are excessive. There is a possibility that the gas in the production wells is increasing. Inspect sealing.' is output to the information display unit 41, and processing then returns to the aforementioned step S1.

Furthermore, in the case where the determination result of step S79 is that the air quantity Fair does not exceed the design value Fairp, the processing proceeds to step S81, and it is determined whether or not the steam quantity Fejt exceeds a preset design value Fejtp. When this determination result is that the steam quantity Fejt exceeds the design value Fejtp, processing proceeds to step S82. The guidance display information of 'The non-condensable gas quantity and the steam quantity are excessive. It is effective to lower the condenser temperature. The gas quantity in the production wells has increased.' is output to the information display unit 41, and processing then returns to the aforementioned step S1. When the determination result of step S81 is that the steam quantity Fejt does not exceed the design value Fejtp, processing proceeds to step S83, and the guidance display information of 'The non-condensable gas quantity is excessive. There is a possibility that the gas in the production wells is increasing.' is output to the information display unit 41, and processing then returns to the aforementioned step S1.

Furthermore, when the determination result of the above step S78 is that the non-condensable gas quantity Fncg does not exceed a preset design value Fncgp, processing proceeds to step S84, and it is determined whether or not the air quantity Fair exceeds the preset design quantity Fairp. When this determination result is that the air quantity Fair exceeds the design value Fairp, the processing proceeds to step S85, and it is determined whether or not the steam quantity exceeds the design value. When the steam quantity does not exceed the design value, processing proceeds to step S86 since there is a possibility of air being flown in from some gas sealing. In this step S86, the guidance display information of 'The air quantity is excessive. Inspect a gas sealing part.' is output to the information display unit 41, and processing then returns to aforementioned step S1. In step S85, processing proceeds to step S87 when the steam quantity exceeds the design value, the guidance display information of 'The air quantity is excessive. It is effective to lower the condenser temperature. Inspect a sealing part.' is output to the information display unit 41, and processing then returns to the aforementioned step S1.

When the determination result of step S84 is that the air quantity Fair does not exceed the design value Fairp, processing proceeds to step S88, the guidance display information of 'The steam quantity is excessive. It is effective to lower the condenser temperature.' is output to the information display unit 41, and processing then returns to the aforementioned step S1. Here, processing of step S3 and FIG. 8 correspond to the steam characteristic evaluation unit 31, processing of step S4 and FIG. 9 correspond to the steam-water separator evaluation unit 32, processing of step S5 and FIG. 10 correspond to the water injection evaluation unit 33, processing of step S6 and FIG. 11 correspond to the silica adherence quantity evaluation unit 34, processing of step S7 and FIG. 12 correspond to the production well pulsation and confluence condition evaluation unit 35, and processing of step S8 and FIG. 13 correspond to the gas extraction system evaluation unit 36.

Next, operations of the above embodiment will be described. In the case of newly establishing a geothermal generation facility 10 or newly installing an automatic steam measurement device 11 and an online diagnostic device 21 at an already existing geothermal generation facility 10, the diagnostic process given in FIG. 7 is carried out by the diagnostic device 21 and the central processing unit 22 at the point of starting operation of the automatic steam measurement device 11 and the online diagnostic device 21. In this diagnostic process, when the analysis data and performance data have not been received from the automatic steam measurement device 11, it waits until they are received. Upon reception thereof, the received analysis data and performance data are stored in the data logger 23 in a time-series manner for every type of data (step S2).

Next, the deviation prediction diagnostic process given in FIG. 8 is carried out. In this deviation prediction diagnostic process, since it is the time of starting operation of the diagnostic device 21, it is determined whether or not the analysis data accumulated by the automatic steam measurement device 11 and the performance data added by the monitor•control device 12 have been accumulated over a certain period of time (step S17). Since prediction diagnosis is carried out by a system for predicting a future condition based on the accumulated data, the prediction diagnosis cannot be carried out when the collection over a certain period of time has not been completed. Therefore, in step S12, it is determined whether or not at least one of the silica concentration, either the chloride ion concentration or the acid conductivity, the non-condensable gas concentration, or the pH is equal to or greater than the corresponding managing upper limit. When all of them are below the corresponding managing upper limits, processing proceeds to step S14, and it is determined whether or not they are equal to or greater than corresponding operation recommended value that is smaller than a predetermined managing upper limit. When all of them are below the corresponding operation recommended value, the geothermal generation facility 10 is determined normal and its guidance display information is displayed on the information display unit 41. As a result, an operator may understand that the geothermal generation facility 10 is operating normally by visually confirming the guidance display information on the information display unit 41.

In this state, if at least one of the silica concentration, either the chloride ion concentration or the acid conductivity, the non-condensable gas concentration, or the pH is equal to or greater than the corresponding managing upper limit, the guidance display information of the analysis data exceeds the managing upper limit is displayed on the information display unit 41, and a warning that the analysis data has exceeded the managing upper limit is output to the information transmission unit 42. For this reason, since the warning of the analysis data exceeding the managing upper limit is transmitted to the monitor•control device 12 via the network 15, the monitor•control device 12 controls a necessary device so as to make the analysis data exceeding the managing upper limit based on the warning be less than the managing upper limit.

Meanwhile, if the accumulation of the analysis data over a certain period of time is completed, a normal model is created based on the analysis data by the principle component analysis, and the crated normal model is stored in the data logger 23. Afterward, a Q statistic and a T² statistic is calculated based on the analysis data in comparison with the normal model every time analysis data is received (step S19). When both of the calculated Q statistic and T² statistic are below the respective corresponding managing upper limits, the geothermal generation facility 10 is determined normal, and the guidance display information is displayed on the information display unit 41.

However, as mentioned before, in the case that, for example, the silica concentration with respect to the hot water flow deviates from correlation with the normal model and the Q statistic exceeds a threshold preset based on the normal model even though the silica concentration and the chloride ion concentration are equal to or less than the respective corresponding managing upper limits, or that the amplitude increases and deviates from the range of the normal model even though the correlation between the hot water flow and the silica concentration is maintained, resulting in the T² statistic exceeding a threshold preset based on the normal model, it is recognized as a prediction that an abnormality will occur. A prediction warning is transmitted to the monitor•control device 12 via the information transmission unit 42, and in addition, abnormal structural factors are calculated based on contribution plots, so the calculated abnormal structural actor is then displayed on the information display unit 41. Therefore, the operator understands the prediction of an abnormality occurrence and takes a countermeasure before the abnormality occurs based on the abnormal structural factors. This allows prevention of an abnormality from occurring.

Monitoring the Q statistic and the T² statistic is a specific method of prediction diagnosis. Moreover, this prediction diagnosis is characteristic in that it is reliable to be more realistic as the accumulated quantity of monitored data increases. Furthermore, when the deviation prediction diagnostic process is completed, the steam-water separator performance diagnostic process given in FIG. 9 is carried out. In this steam-water separator performance diagnostic process, in a state where the silica concentration and the chloride ion concentration are not exceeding the managing upper limit, the separator is judged as normal and the guidance display information of 'The separator is functioning effectively. The water removal rate is 99.99%.' is displayed on the information display unit 41.

However, if at least either one of the silica concentration or the chloride ion concentration exceeds the corresponding managing upper limit, the water removal rate ηW of the separator is calculated. In the case where there is a water spray device 101 when the calculated water removal rate ηW is equal to or less than the reference value ηWs, the guidance display information of 'Improvement is possible by the separator independently. Carrying out water spraying after confirmation of the water level is recommended. The water removal rate is 99.OO %.' is displayed on the information display unit 41. Therefore, the operator may restore the water removal rate ηW of the separator by setting the water injection amount of the water spray device 101 and then injecting water.

However, there is an example where old devices installed in the past are not provided with a water spray device. In that case, since the water removal rate ηW of the separator cannot be improved independently, the guidance display information and the water removal rate ηW are displayed on the information display unit 41. Moreover, the separator itself is normal in the case where the water removal rate ηW is equal to or greater than the reference value ηWs when at least either one of the silica concentration or the chloride ion concentration has exceeded the managing upper limit, so the guidance display information that the separator is functioning effectively is displayed on the information display unit 41. In this case, it is judged as an abnormality due to another factor such as adherence of a foreign matter to the steam turbine.

Figure 10:
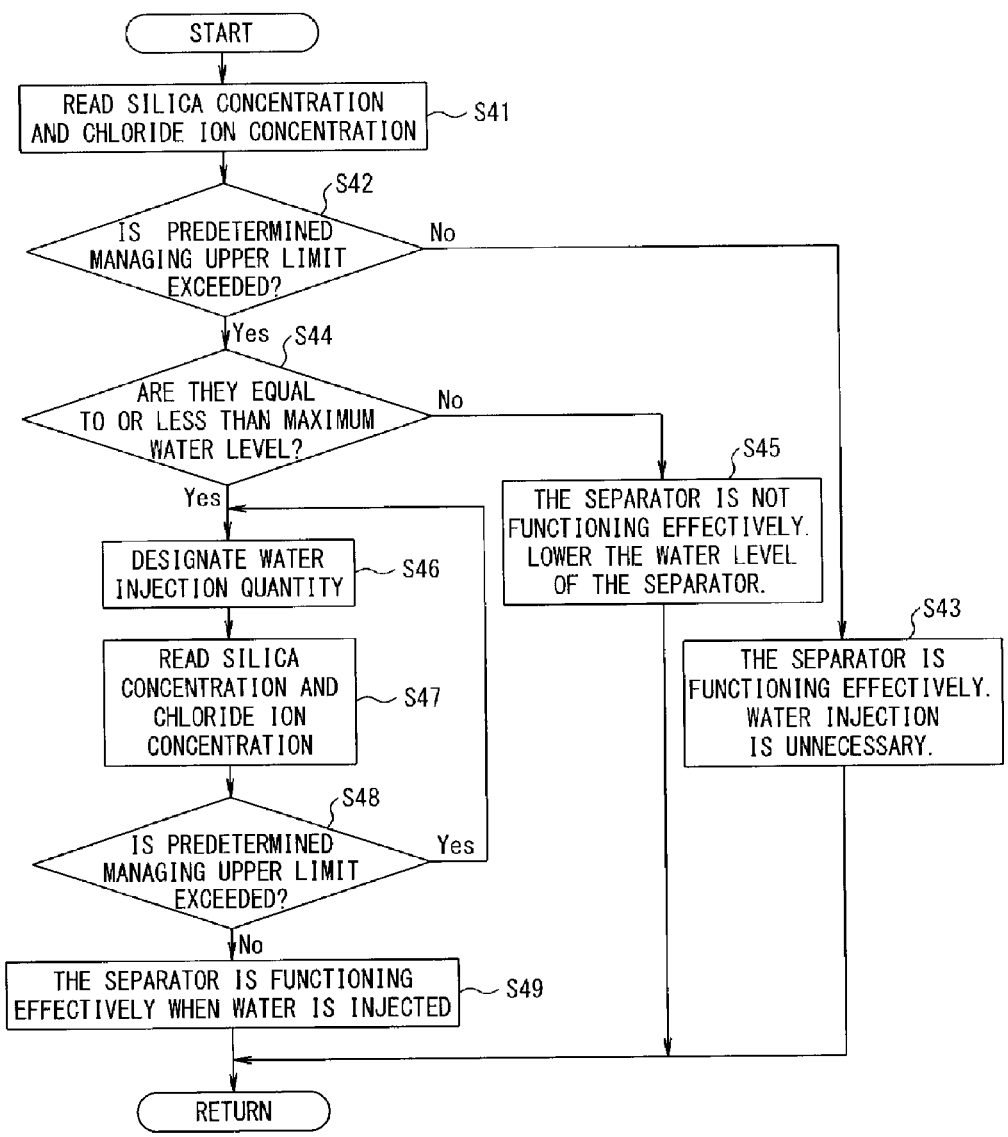
FIG. 10 is a flowchart showing an exemplary steam-water separator water injection evaluation process given in S5 of FIG. 7.

With this embodiment, since processing proceeds to step S5 after the steam-water separator deviation prediction diagnostic process and a steam-water separator deviation water injection evaluation process given in FIG. 10 are carried out, the water spray devices 101, 103, and 107 are operated to clean the steam by spraying water, when at least either one of the silica concentration or the chloride ion concentration exceeds the managing upper limit. At this time, since the water spray device 101 is placed on the inlet side of the high-pressure separator 102, cleaning steam from the production wells PW1 to PWn by spraying water increases an existing density (quantity) of mist (micro-water drops) per unit volume. This increases opportunities for mist to make contact and unite (adhere) to the other, makes water particles further adhere to the mist, which includes mineral ions that float in the steam, and increases particle diameter, whereby heightening of the water separation efficiency by the separator may be expected.

The fact that separation efficiency rises when the water drop diameter (particle diameter) increases is apparent from Stokes' centrifugal-sedimentation rate equation given below.

$$vc = (Dp^2 \Delta\rho \times r \times \omega^2)/(18 \times \mu) \tag{4}$$

Where vc denotes particle centrifugal-sedimentation rate (m/s), Δρ denotes density difference between particles (water) and continuous layers (water vapor) (kg/m³), Dp denotes particle diameter (m), ω denotes rotating angle velocity (rad/s), μ denotes viscosity of continuous layers (water vapor) (Pa·s), and r denotes separator radius (m).

In other words, the particle centrifugal-sedimentation rate increases in proportion to the square of the particle diameter. If the centrifugal-sedimentation rate increases, the separation efficiency will definitely improve as long as the retention time within the separator is the same. Water vapor used for typical geothermal power generation is saturated vapor, where even if water is sprayed, this added water is evaporated, increasing the steam content. This result will make it impossible to reduce the retention time within the separator. Accordingly, the separation efficiency is surely improved.

Moreover, the equation for calculating the quantity of mineral matter within the separator-separated steam is given below.

$$Fm = Fs \times \eta fw \times (1 - \eta sw/100) \times Cmw \quad (5)$$

Where Fm denotes quantity of mineral matter within the separator-separated steam (g/h), Fs denotes steam flow (t/h), Fw denotes hot water flow (t/h), $\eta fw$ denotes moisture content of two-phase flow supplied by a separator $(-)=Fw/(Fs+Fw)$, $\eta sw$ denotes water removal rate (%), and Cmw denotes mineral concentration within hot water (ppm).

Steam cleaning by spraying water is very effective. The fact that spraying water having approximately 2% steam supplied by the separator enhances the moisture separation efficiency by approximately 0.04% and that the mineral matter entrained as a result is reduced is confirmed with an actual device. For example, when production well steam of 2000 wppm mineral matter (g/t) within hot water with 100 t/h and 5% hot water content is supplied to the separator and the hot water separation rate at that time is 99.92%, the mineral matter contained in the separator-separated steam is:

$$(100 t/h) \times (0.05) \times (1 - 0.9992) \times (2000 g/t) = 8 g/h \quad (6)$$

Consequently, when 2% water is sprayed at the production well steam just before the separator and the hot water separation rate increases by 0.04% to 99.96%, the mineral matter within the separator-separated steam is reduced by half as follows:

$$[(100 t/h) \times (0.05 + 0.02) \times (1 - 0.9996) \times (2000 g/t) \times 5/(5+2)] = 4 g/h \quad (7)$$

In this manner, the fact that the entrained mineral matter within the separator-separated steam may be reduced is apparent even from the calculation based on the actual performance.

When this steam-water separator water injection evaluation process is completed, processing proceeds to step S6, and a steam turbine silica adhesion state estimation and evaluation process given in FIG. 11 is carried out. In this steam turbine silica adhesion state estimation and evaluation process, the steam from the high-pressure separator 102 and the low-pressure separator 105 to be supplied to the steam turbine 105 is automatically measured in short cycles and sent as analysis data to the monitor•control device 12. Moreover, various performance data is added to the analysis data by the monitor•control device 12 and then transmitted online to the diagnostic device 21 via the network 15. Accordingly, the diagnostic device 21 is capable of accumulating silica concentration data in short cycles, so that silica adherence accumulated quantity to the steam turbine 105 may be calculated based on this silica concentration data. In addition, the degree of silica adherence to the steam turbine 105 may be estimated from the time-series tendencies of the turbine inlet pressure, the turbine outlet pressure, and the turbine casing pressure, which are indices of accumulated quantity of silica and adherence of scales such as silica in the steam turbine. At this time, the silica adherence state to the steam turbine nozzle may be more precisely estimated based on the rate of changes through detection of an increasing tendency of the accumulated quantity of silica and increasing tendencies of the turbine inlet pressure, the turbine outlet pressure, and the turbine casing pressure.

When the steam turbine silica adhesion state estimation and evaluation process is completed, an evaluation process for pulsation and confluence condition of production wells is carried out next. In this evaluation process for pulsation and confluence, when at least either one of the silica concentration or the chloride ion concentration exceeds a managing reference value, it is possible to understand whether the factors thereof are based on pulsation of the production wells or on change in confluence condition due to either addition or subtraction of a production well with accuracy.

Lastly, the gas extraction system operating status diagnostic process is carried out in step S8. In this gas extraction system operating status diagnostic process, non-condensable gas quantity Fncg, steam quantity Fejt saturated in the non-condensable gas, and air quantity Fair released from cooling water are calculated. Then, it is determined whether or not the total sum thereof or total extracted gas quantity Fall exceeds the managing upper limit. When it does not exceed the managing upper limit, it is determined whether or not the extracted steam pressure by the ejector 121 has reached a preset value or whether the gas extraction system 120 is normal. Meanwhile, when the total extracted gas quantity Fall exceeds the managing upper limit, it is determined whether any one of the non-condensable gas quantity Fncg, the air quantity Fair, or the steam quantity Fejt or a multiple combination thereof exceeds a design value. Appropriate guidance display information indicative of a quantity exceeding the design value may be displayed on the information display unit 41 to inform to the operator.

The quantity of driving steam for driving the ejector cannot be specified as it changes depending on the configuration and operating pressure of the gas extraction system. However, in a certain example of using the geothermal steam containing approximately 2% non-condensable gas at a power plant, approximately 4% to 7% of the steam to be supplied to a steam turbine is consumed. If this steam quantity is optimized for the present conditions, increase in electricity generated corresponding to the amount of steam saved may be expected. While in the above embodiment, the case of carrying our various processes based on whether or not at least either one of the silica concentration or the chloride ion concentration exceeds the managing upper limit has been described, the present invention is not limited thereto, and acid conductivity is applicable, instead of the chloride ion concentration.

Moreover, analysis data evaluated by the steam characteristic evaluation unit 31 is not limited to the case of applying all of the aforementioned silica concentration, either chloride ion concentration or acid conductivity, non-condensable gas concentration and pH. In accordance with the steam conditions of the geothermal generation facility 10, a part of the above data or other new analysis data may be added thereto. The deviation prediction diagnostic process carried out by steam characteristics evaluation unit applies the principle component analysis. The number of pieces of analysis data is not limited, and a normal model may be created using more analysis data, which allows prediction beforehand of an abnormality even when the abnormality occurs in any of the pieces of data.

Figure 14:
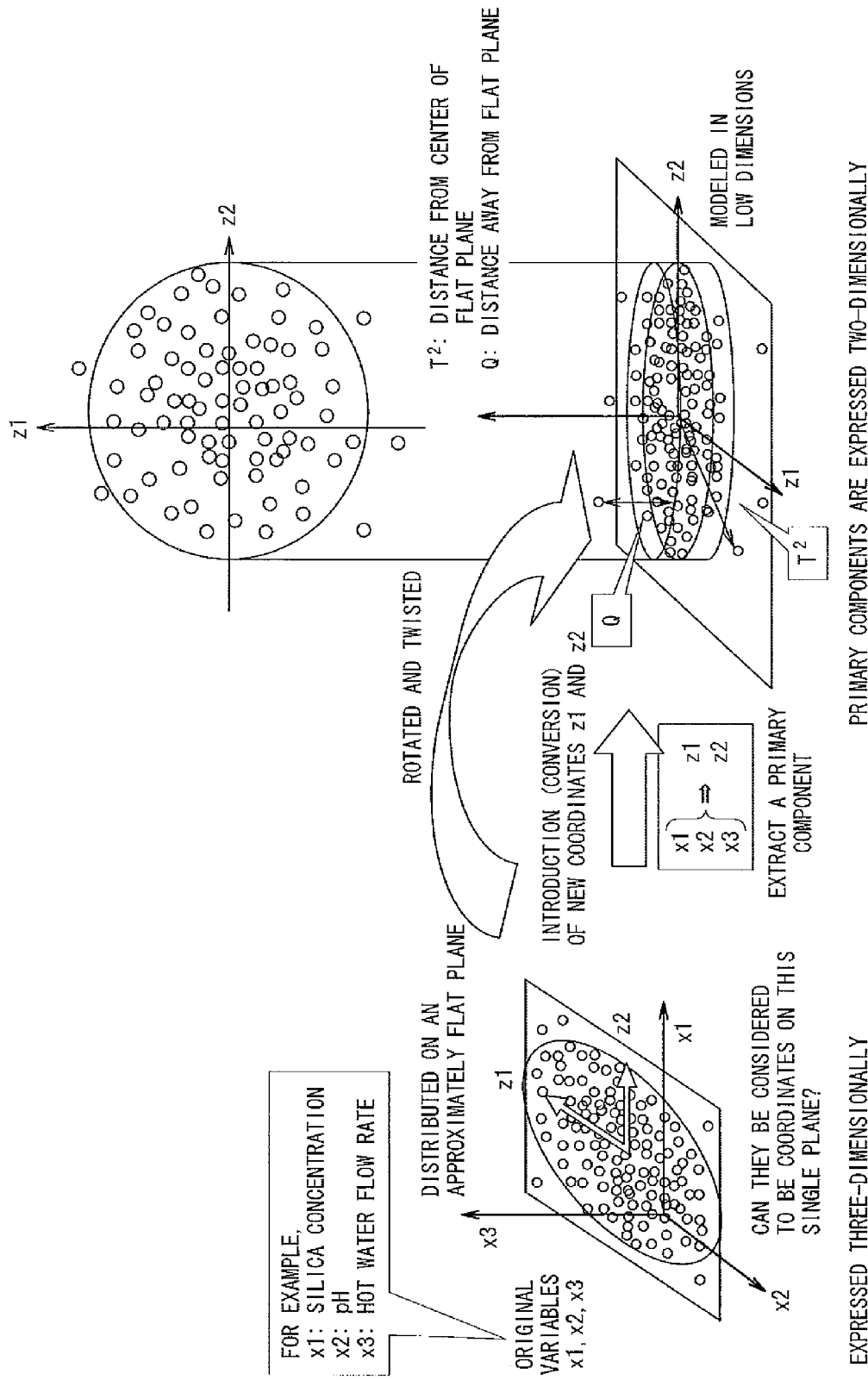
FIG. 14 is a diagram for accompanying description of a 3-variable principle component analysis related to the correlation chart of FIG. 6A.

Furthermore, while in the embodiment described above, two variables are used as an example for the principle component analysis, number of variables is not limited thereto. For example, when a first variable x1 denotes silica concentration, a second variable x2 denotes pH, and a third variable x3 denotes hot water flow rate, these variables are represented three-dimensionally as shown in FIG. 14. At this time, assuming that the data is distributed in a flat plane of z1 and z2, introducing new coordinates z1 and z2 and finding a principle component makes it possible to represent the principle component in two-dimensional space or low dimensions, as shown in FIG. 14. Distance along the radius from the origin of the coordinates is the $T^2$ statistic, and up-and-down distance is the Q statistic. The existence of an abnormality may be judged based on the amount of deviation from the normal model that is represented inside of the circle. Even further, while in the embodiment described above, the case where an abnormality judgment based on whether or not the analysis data exceeds the managing upper limit is carried out has been described, not limited thereto, an abnormality judgment based on whether or not the data exceeds an operation recommended value smaller than the managing upper limit may also be carried out.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An online diagnosis method for a geothermal generation facility comprising the steps of:
    receiving analysis data online from an automatic steam measurement device that measures a characteristic of steam to be supplied to a steam turbine from a steam-water separator at the geothermal generation facility and measures performance data of the geothermal generation facility, wherein the analysis data is at least a silica concentration and either a chloride ion concentration or acid conductivity and the performance data is at least steam flow and hot water flow separated by the steam-water separator;
    accumulating the analysis data and the performance data online; and
    diagnosing the geothermal generation facility based on the accumulated analysis data, the accumulated performance data, and a predetermined managing upper limit or a predetermined operation recommended value for each data.

2. An online diagnosis method for a geothermal generation facility comprising the steps of:
    receiving analysis data online from an automatic steam measurement device that measures a characteristic of steam to be supplied to a steam turbine from a steam-water separator at the geothermal generation facility and measures performance data of the geothermal generation facility, wherein the analysis data is at least a silica concentration, either a chloride ion concentration or acid conductivity, a non-condensable gas concentration, and pH and the performance data is at least steam flow and hot water flow separated by the steam-water separator;
    accumulating the analysis data and the performance data in a time-series manner and storing in a data storage unit; and
    diagnosing the geothermal generation facility based on the received data, wherein diagnosing includes determining that the silica concentration and either the chloride ion concentration or the acid conductivity accumulated and stored in the data storage unit do not reach a predetermined managing upper limit or a predetermined operation recommended value and predicting a deviation of the analysis data and the performance data from the predetermined managing upper limit or the predetermined operation recommended value based on a statistic calculation and a principle component analysis, which is a multivariate analysis.

3. The online diagnosis method for the geothermal generation facility according to claim 1, wherein the analysis data is the silica concentration and the chloride ion concentration, and the performance data is the steam flow and the hot water flow separated by the steam-water separator, the method further comprising:
    monitoring the silica concentration and the chloride ion concentration;
    warning the geothermal generation facility based on a level of the predetermined managing upper limit or the predetermined operation recommended value and
    when at least either one of the silica concentration or the chloride ion concentration exceeds the predetermined managing upper limit or the predetermined operation recommended value, outputting a performance diagnostic result of the steam-water separator when a water removal rate of the steam-water separator that is calculated based on the chloride ion concentration, the steam flow, and the hot water flow is equal to or less than a predetermined reference value.

4. The online diagnosis method for the geothermal generation facility according to claim 3, wherein the performance data includes at least the steam flow, the hot water flow, and a water level of the water-steam separator, and when the water removal rate is equal to or less than the predetermined reference value and the water level of the water-steam separator does not exceed a predetermined maximum water level, the method further comprises:
    outputting a spray start instruction to a spray device for spraying water to steam to be supplied to the steam turbine from the water-steam separator.

5. The online diagnosis method for the geothermal generation facility according to claim 1, further comprising:
    calculating a silica accumulated quantity entering the steam turbine based on the silica concentration and the steam flow; and
    estimating a silica adherence state to the steam turbine by comparing the calculated silica accumulated quantity with a turbine inlet pressure, a turbine outlet pressure, and a turbine casing pressure closely related to the silica accumulated quantity to obtain time-series tendencies found through the comparison.

6. The online diagnosis method for the geothermal generation facility according to claim 1, further comprising:
    calculating a quantity of gas to be extracted based on data of a non-condensable gas concentration from the automatic steam measurement device and performance data of a condenser in a latter stage of the steam turbine; and
    diagnosing an operating status of a gas extraction device from a tendency found from a result of the calculation.

7. The online diagnosis method for the geothermal generation facility according to claim 1, wherein the performance data includes a valve opening degree of a secondary flow regulating valve for adjusting a flow rate of geothermal steam ejected from a production well at the geothermal generation facility, and when at least one of either the chloride ion concentration or the acid conductivity and the silica exceeds the predetermined managing upper limit or the predetermined operation recommended value, but does not continuously exceed the predetermined managing upper limit or the predetermined operation recommended value, and the valve opening degree of the secondary flow regulating valve is changed, the method further comprising outputting a performance diagnostic result that there is pulsation of the production well.

8. The online diagnostic method for the geothermal generation facility according to claim 1, wherein:

the performance data includes a valve opening degree of a secondary flow rate regulating valve for adjusting a flow rate of geothermal steam ejected from a production well at the geothermal generation facility, and when at least one of either the chloride ion concentration or the acid conductivity, and the silica concentration exceeds the predetermined managing upper limit or the predetermined operation recommended value, but does not continuously exceed the predetermined managing upper limit or the predetermined operation recommended value, and the valve opening degree of the secondary flow regulating valve is not changed, and when at least one of either the chloride ion concentration or the acid conductivity, and the silica concentration continuously exceeds the predetermined managing upper limit or the predetermined operation recommended value, the method further comprises outputting a performance diagnostic result that a confluence condition is changed by adding or subtracting the production well.

9. The online diagnosis method for the geothermal generation facility according to claim 2, wherein:

the performance data includes a valve opening degree of a secondary flow regulating valve for adjusting a flow rate of geothermal steam ejected from a production well at the geothermal generation facility, and when at least one of either the chloride ion concentration or the acid conductivity, and the silica concentration exceed the predetermined managing upper limit or the predetermined operation recommended value, but does not continuously exceed the predetermined managing upper limit or the predetermined operation recommended value, and the valve opening degree of the secondary flow regulating valve is changed, the method further comprises outputting a performance diagnostic result that there is pulsation of the production well; and when at least one of either the chloride ion concentration or the acid conductivity, and the silica concentration exceeds the predetermined managing upper limit or the predetermined operation recommended value, but does not continuously exceed the predetermined managing upper limit or the predetermined operation recommended value, and the valve opening degree of the secondary flow regulating valve is not changed, and when at least one of either the chloride ion concentration or the acid conductivity, and the silica concentration continuously exceeds the predetermined managing upper limit or the predetermined operation recommended value, the method further comprises outputting a performance diagnostic result that a confluence condition is changed by adding or subtracting the production well.

\* \* \* \* \*

UNITED STATES PATENT AND TRADEMARK OFFICE
CERTIFICATE OF CORRECTION

PATENT NO. : 8,407,027 B2
APPLICATION NO. : 13/054972
DATED : March 26, 2013
INVENTOR(S) : Ichiro Myougan et al.

It is certified that error appears in the above-identified patent and that said Letters Patent is hereby corrected as shown below:

Title Page, replace item (73) with the following:
-- (73) Assignee: Fuji Electric Co., Ltd., Kawasaki-shi (JP) --

Signed and Sealed this
Fifteenth Day of October, 2013

Teresa Stanek Rea
*Deputy Director of the United States Patent and Trademark Office*